(12) United States Patent
Sirovskiy et al.

(10) Patent No.: US 11,623,368 B2
(45) Date of Patent: Apr. 11, 2023

(54) METHODS FOR THERMAL FORMING AN OBJECT

(71) Applicant: Align Technology, Inc., San Jose, CA (US)

(72) Inventors: Yevgeniy Sirovskiy, Dublin, CA (US); James C. Culp, Pleasanton, CA (US)

(73) Assignee: Align Technology, Inc., San Jose, CA (US)

( * ) Notice: Subject to any disclaimer, the term of this patent is extended or adjusted under 35 U.S.C. 154(b) by 0 days.

(21) Appl. No.: 16/983,876

(22) Filed: Aug. 3, 2020

(65) Prior Publication Data

US 2021/0001514 A1 Jan. 7, 2021

Related U.S. Application Data

(63) Continuation of application No. 14/796,824, filed on Jul. 10, 2015, which is a continuation of application
(Continued)

(51) Int. Cl.
*B29C 51/42* (2006.01)
*B29B 13/02* (2006.01)

(52) U.S. Cl.
CPC .......... *B29B 13/023* (2013.01); *B29C 51/422* (2013.01); *B29B 2013/027* (2013.01)

(58) Field of Classification Search
CPC .............................. A61C 13/00; B29C 51/022
See application file for complete search history.

(56) References Cited

U.S. PATENT DOCUMENTS 2,467,432 A 4/1949 Kesling
RE25,313 E * 1/1963 Walker .................. B29C 51/422
264/153
(Continued)

FOREIGN PATENT DOCUMENTS

AU 3031677 A 5/1979
AU 517102 B2 7/1981
(Continued)

OTHER PUBLICATIONS

AADR. American Association for Dental Research, Summary of Activities, Mar. 20-23, 1980, Los Angeles, CA, p. 195.
(Continued)

*Primary Examiner* — Andrew D Graham
(74) *Attorney, Agent, or Firm* — Fortem IP LLP

(57) ABSTRACT

Methods for thermal forming an object are provided. In some embodiments, a method includes reading a mold identifier located on or in a mold, and determining mold process information from the mold identifier, the mold process information including heating information. The method can include heating a thermoformable material according to the heating information by adjusting power of one or more independently controllable heat sources. The method can also include monitoring one or more temperatures from a plurality of temperature sensing elements operably coupled to different areas of the thermoformable material. The thermoformable material can be heated according to the heating information and in response to the one or more monitored temperatures such that each of the different areas of the thermoformable material reach a respective desired temperature. The method can further include disposing the heated thermoformable material over at least a portion of the mold to form the object.

27 Claims, 10 Drawing Sheets

Related U.S. Application Data

No. 13/186,374, filed on Jul. 19, 2011, now Pat. No. 9,108,338.

(60) Provisional application No. 61/475,212, filed on Apr. 13, 2011.

(56) References Cited

U.S. PATENT DOCUMENTS

| | | | |
|---|---|---|---|
| 3,256,564 A * | 6/1966 | Welshon | B29C 51/422 425/340 |
| 3,407,500 A | 10/1968 | Kesling | |
| 3,600,808 A | 8/1971 | Reeve et al. | |
| 3,660,900 A | 5/1972 | Andrews et al. | |
| 3,683,502 A | 8/1972 | Wallshein et al. | |
| 3,692,288 A | 9/1972 | Robert | |
| 3,738,005 A | 6/1973 | Cohen et al. | |
| 3,860,803 A * | 1/1975 | Levine | B21D 37/08 700/98 |
| 3,916,526 A | 11/1975 | Schudy | |
| 3,922,786 A | 12/1975 | Lavin | |
| 3,950,851 A | 4/1976 | Bergersen | |
| 3,983,628 A | 10/1976 | Acevedo | |
| 4,014,096 A | 3/1977 | Dellinger | |
| 4,195,046 A | 3/1980 | Kesling et al. | |
| 4,253,828 A | 3/1981 | Coles et al. | |
| 4,324,546 A | 4/1982 | Heitlinger et al. | |
| 4,324,547 A | 4/1982 | Arcan et al. | |
| 4,348,178 A | 9/1982 | Kurz | |
| 4,360,491 A * | 11/1982 | Holden, Jr. | B29C 51/082 264/294 |
| 4,478,580 A | 10/1984 | Barrut et al. | |
| 4,500,294 A | 2/1985 | Lewis et al. | |
| 4,504,225 A | 3/1985 | Yoshii | |
| 4,505,673 A | 3/1985 | Yoshii et al. | |
| 4,526,540 A | 7/1985 | Dellinger et al. | |
| 4,575,330 A | 3/1986 | Hull et al. | |
| 4,575,805 A | 3/1986 | Moermann et al. | |
| 4,591,341 A | 5/1986 | Andrews et al. | |
| 4,609,349 A | 9/1986 | Cain et al. | |
| 4,611,288 A | 9/1986 | Duret et al. | |
| 4,619,806 A * | 10/1986 | Gunn | B29C 51/04 264/522 |
| 4,656,860 A | 4/1987 | Orthuber et al. | |
| 4,663,720 A * | 5/1987 | Duret | A61C 9/00 700/163 |
| 4,664,626 A | 5/1987 | Kesling et al. | |
| 4,676,747 A | 6/1987 | Kesling et al. | |
| 4,742,464 A | 5/1988 | Duret et al. | |
| 4,755,139 A | 7/1988 | Abbatte et al. | |
| 4,758,145 A * | 7/1988 | Hautemont | B29C 51/46 264/322 |
| 4,763,791 A * | 8/1988 | Halverson | A61C 9/00 206/369 |
| 4,778,372 A | 10/1988 | Mutti et al. | |
| 4,793,803 A | 12/1988 | Martz et al. | |
| 4,798,534 A | 1/1989 | Breads et al. | |
| 4,836,778 A | 6/1989 | Baumrind et al. | |
| 4,837,732 A | 6/1989 | Brandestini et al. | |
| 4,850,864 A | 7/1989 | Diamond et al. | |
| 4,850,865 A | 7/1989 | Napolitano et al. | |
| 4,856,991 A | 8/1989 | Breads et al. | |
| 4,877,398 A | 10/1989 | Kesling et al. | |
| 4,880,380 A | 11/1989 | Martz et al. | |
| 4,889,238 A | 12/1989 | Batchelor et al. | |
| 4,890,608 A | 1/1990 | Steer et al. | |
| 4,909,722 A | 3/1990 | Wakayama et al. | |
| 4,935,635 A | 6/1990 | O'Harra et al. | |
| 4,936,862 A | 6/1990 | Walker et al. | |
| 4,937,928 A | 7/1990 | Van et al. | |
| 4,941,826 A | 7/1990 | Loran et al. | |
| 4,964,770 A | 10/1990 | Steinbichler et al. | |
| 4,975,052 A | 12/1990 | Spencer et al. | |
| 4,983,334 A | 1/1991 | Adell et al. | |
| 5,011,405 A | 4/1991 | Lemchen | |
| 5,017,133 A | 5/1991 | Miura et al. | |
| 5,027,281 A | 6/1991 | Rekow et al. | |
| 5,035,613 A | 7/1991 | Breads et al. | |
| 5,055,039 A | 10/1991 | Abbatte et al. | |
| 5,059,118 A | 10/1991 | Breads et al. | |
| 5,100,316 A | 3/1992 | Wildman et al. | |
| 5,113,424 A * | 5/1992 | Burdea | A61B 6/08 378/168 |
| 5,121,333 A | 6/1992 | Riley et al. | |
| 5,125,832 A | 6/1992 | Kesling | |
| 5,128,870 A | 7/1992 | Erdman et al. | |
| 5,130,064 A | 7/1992 | Smalley et al. | |
| 5,131,843 A | 7/1992 | Hilgers et al. | |
| 5,131,844 A | 7/1992 | Marinaccio et al. | |
| 5,135,685 A * | 8/1992 | Masuhara | C08F 2/48 264/406 |
| 5,135,686 A * | 8/1992 | Masuhara | A61C 19/003 264/1.36 |
| 5,139,419 A | 8/1992 | Andreiko et al. | |
| 5,145,364 A | 9/1992 | Martz et al. | |
| 5,176,517 A | 1/1993 | Truax et al. | |
| 5,184,306 A | 2/1993 | Erdman et al. | |
| 5,186,623 A | 2/1993 | Breads et al. | |
| 5,257,203 A * | 10/1993 | Riley | A61C 13/0004 700/163 |
| 5,273,429 A | 12/1993 | Rekow et al. | |
| 5,278,756 A | 1/1994 | Lemchen et al. | |
| 5,280,434 A * | 1/1994 | Ekendahl | B29C 51/422 340/588 |
| 5,290,490 A | 3/1994 | Nied et al. | |
| 5,328,362 A | 7/1994 | Watson et al. | |
| 5,338,198 A | 8/1994 | Wu et al. | |
| 5,340,309 A | 8/1994 | Robertson et al. | |
| 5,342,202 A | 8/1994 | Deshayes et al. | |
| 5,368,478 A | 11/1994 | Andreiko et al. | |
| 5,382,164 A | 1/1995 | Stern et al. | |
| 5,395,238 A | 3/1995 | Andreiko et al. | |
| 5,431,562 A | 7/1995 | Andreiko et al. | |
| 5,440,326 A | 8/1995 | Quinn et al. | |
| 5,440,496 A | 8/1995 | Andersson et al. | |
| 5,447,432 A | 9/1995 | Andreiko et al. | |
| 5,452,219 A | 9/1995 | Dehoff et al. | |
| 5,454,717 A | 10/1995 | Andreiko et al. | |
| 5,456,600 A | 10/1995 | Andreiko et al. | |
| 5,474,448 A | 12/1995 | Andreiko et al. | |
| RE35,169 E | 3/1996 | Lemchen et al. | |
| 5,518,397 A | 5/1996 | Andreiko et al. | |
| 5,528,735 A | 6/1996 | Strasnick et al. | |
| 5,533,895 A | 7/1996 | Andreiko et al. | |
| 5,542,842 A | 8/1996 | Andreiko et al. | |
| 5,549,476 A | 8/1996 | Stern et al. | |
| 5,562,448 A | 10/1996 | Mushabac | |
| 5,571,473 A | 11/1996 | Fujii | |
| 5,587,912 A | 12/1996 | Andersson et al. | |
| 5,605,459 A | 2/1997 | Kuroda et al. | |
| 5,607,305 A | 3/1997 | Andersson et al. | |
| 5,614,075 A | 3/1997 | Andre, Sr. et al. | |
| 5,621,648 A | 4/1997 | Crump et al. | |
| 5,645,420 A | 7/1997 | Bergersen et al. | |
| 5,645,421 A | 7/1997 | Slootsky et al. | |
| 5,655,653 A | 8/1997 | Chester et al. | |
| 5,683,243 A | 11/1997 | Andreiko et al. | |
| 5,692,894 A | 12/1997 | Schwartz et al. | |
| 5,725,376 A | 3/1998 | Poirier et al. | |
| 5,725,378 A | 3/1998 | Wang et al. | |
| 5,733,126 A | 3/1998 | Andersson et al. | |
| 5,740,267 A | 4/1998 | Echerer et al. | |
| 5,742,700 A | 4/1998 | Yoon et al. | |
| 5,778,145 A * | 7/1998 | De Nichilo | B29B 13/023 219/388 |
| 5,799,100 A | 8/1998 | Clarke et al. | |
| 5,800,174 A | 9/1998 | Andersson et al. | |
| 5,823,778 A | 10/1998 | Schmitt et al. | |
| 5,848,115 A | 12/1998 | Little et al. | |
| 5,857,853 A | 1/1999 | Van et al. | |
| 5,866,058 A | 2/1999 | Batchelder et al. | |
| 5,879,158 A | 3/1999 | Doyle et al. | |
| 5,880,961 A | 3/1999 | Crump et al. | |
| 5,880,962 A | 3/1999 | Andersson et al. | |

(56) References Cited

U.S. PATENT DOCUMENTS

| | | | |
|---|---|---|---|
| 5,934,288 A | 8/1999 | Avila et al. | |
| 5,957,686 A | 9/1999 | Anthony et al. | |
| 5,964,587 A | 10/1999 | Sato et al. | |
| 5,971,754 A | 10/1999 | Sondhi et al. | |
| 5,975,879 A * | 11/1999 | Dresen | B29C 43/203 264/297.5 |
| 5,975,893 A * | 11/1999 | Chishti | A61B 6/466 |
| 6,015,289 A | 1/2000 | Andreiko et al. | |
| 6,044,309 A | 3/2000 | Honda et al. | |
| 6,049,743 A | 4/2000 | Baba et al. | |
| 6,062,861 A | 5/2000 | Andersson | |
| 6,068,482 A | 5/2000 | Snow et al. | |
| 6,099,314 A | 8/2000 | Kopelman et al. | |
| 6,123,544 A | 9/2000 | Cleary | |
| 6,152,731 A | 11/2000 | Jordan et al. | |
| 6,157,004 A * | 12/2000 | Bizzio | A61C 13/20 219/390 |
| 6,183,248 B1 * | 2/2001 | Chishti | A61C 7/00 433/6 |
| 6,190,165 B1 | 2/2001 | Andreiko et al. | |
| 6,217,325 B1 | 4/2001 | Chishti et al. | |
| 6,217,334 B1 | 4/2001 | Hultgren et al. | |
| 6,224,366 B1 | 5/2001 | De Nichilo | |
| 6,227,851 B1 | 5/2001 | Chishti et al. | |
| 6,244,861 B1 | 6/2001 | Andreiko et al. | |
| 6,293,790 B1 | 9/2001 | Hilliard | |
| 6,299,440 B1 | 10/2001 | Phan et al. | |
| 6,303,059 B1 * | 10/2001 | Foser | A61C 13/20 264/16 |
| 6,309,215 B1 | 10/2001 | Phan et al. | |
| 6,315,553 B1 | 11/2001 | Sachdeva et al. | |
| 6,322,359 B1 | 11/2001 | Jordan et al. | |
| 6,350,120 B1 | 2/2002 | Sachdeva et al. | |
| 6,371,761 B1 | 4/2002 | Cheang et al. | |
| 6,382,975 B1 | 5/2002 | Poirier et al. | |
| 6,386,864 B1 * | 5/2002 | Kuo | A61C 7/00 433/215 |
| 6,398,548 B1 | 6/2002 | Muhammad et al. | |
| 6,402,707 B1 | 6/2002 | Ernst et al. | |
| 6,454,565 B2 | 9/2002 | Phan et al. | |
| 6,482,298 B1 | 11/2002 | Bhatnagar et al. | |
| 6,497,574 B1 | 12/2002 | Miller | |
| 6,524,101 B1 * | 2/2003 | Phan | A61C 7/00 433/24 |
| 6,554,611 B2 | 4/2003 | Shishti et al. | |
| 6,572,372 B1 * | 6/2003 | Phan | A61C 7/00 433/18 |
| 6,629,840 B2 | 10/2003 | Chishti et al. | |
| 6,705,863 B2 | 3/2004 | Phan et al. | |
| 6,719,449 B1 | 4/2004 | Laugharn, Jr. et al. | |
| 6,722,880 B2 | 4/2004 | Chishti et al. | |
| 6,976,627 B1 * | 12/2005 | Culp | G06K 19/06028 235/462.01 |
| 6,976,841 B1 * | 12/2005 | Osterwalder | A61C 19/063 433/29 |
| 7,092,784 B1 * | 8/2006 | Simkins | B33Y 50/02 700/182 |
| 7,201,576 B2 * | 4/2007 | Tricca | A61C 7/00 433/24 |
| 7,245,977 B1 | 7/2007 | Simkins | |
| 7,245,985 B2 | 7/2007 | Magill et al. | |
| 7,261,533 B2 * | 8/2007 | Wrosz | A61C 7/00 425/110 |
| 7,357,634 B2 * | 4/2008 | Knopp | A61C 7/146 433/24 |
| 7,361,020 B2 * | 4/2008 | Abolfathi | A61C 9/0006 433/213 |
| 7,383,198 B1 | 6/2008 | Sepe | |
| 7,481,647 B2 * | 1/2009 | Sambu | B33Y 30/00 425/436 R |
| 7,600,999 B2 * | 10/2009 | Knopp | A61C 7/146 433/24 |
| 7,604,181 B2 * | 10/2009 | Culp | G06K 13/07 235/494 |
| 7,658,610 B2 * | 2/2010 | Knopp | A61C 7/146 433/24 |
| 7,717,708 B2 * | 5/2010 | Sachdeva | A61C 9/0046 433/24 |
| 7,802,987 B1 * | 9/2010 | Phan | B33Y 50/00 705/2 |
| 7,987,099 B2 * | 7/2011 | Kuo | B33Y 50/00 705/2 |
| 8,026,943 B2 | 9/2011 | Weber et al. | |
| 8,060,236 B2 | 11/2011 | Hilliard | |
| 9,108,338 B2 | 8/2015 | Sirovskiy et al. | |
| 2002/0006597 A1 | 1/2002 | Andreiko et al. | |
| 2002/0015934 A1 * | 2/2002 | Rubbert | G06T 17/00 433/29 |
| 2002/0058082 A1 * | 5/2002 | Muirhead | B29C 66/54 425/384 |
| 2003/0009252 A1 | 1/2003 | Pavlovskaia et al. | |
| 2003/0042396 A1 | 3/2003 | Foreman et al. | |
| 2003/0139834 A1 | 7/2003 | Nikolskiy et al. | |
| 2003/0165660 A1 | 9/2003 | Schwarzwalder et al. | |
| 2003/0224311 A1 | 12/2003 | Cronauer et al. | |
| 2004/0128010 A1 | 7/2004 | Pavlovskaia et al. | |
| 2004/0188006 A1 * | 9/2004 | Montagna | B32B 37/153 156/244.16 |
| 2004/0265409 A1 * | 12/2004 | Keeley | B29B 13/023 425/143 |
| 2005/0055118 A1 | 3/2005 | Nikolskiy et al. | |
| 2005/0194705 A1 * | 9/2005 | Smith | B29C 48/10 264/40.1 |
| 2006/0073433 A1 * | 4/2006 | Anderson | A61C 7/08 433/6 |
| 2006/0078688 A1 * | 4/2006 | DeSimone | C08F 2/46 427/496 |
| 2006/0078841 A1 * | 4/2006 | DeSimone | A61C 7/08 433/6 |
| 2006/0093982 A1 * | 5/2006 | Wen | A61C 7/08 433/6 |
| 2007/0122591 A1 * | 5/2007 | Anderson | B29C 51/02 428/156 |
| 2007/0122592 A1 * | 5/2007 | Anderson | A61C 13/0003 428/156 |
| 2007/0252297 A1 * | 11/2007 | Sperry | F16K 31/084 264/40.1 |
| 2008/0159798 A1 * | 7/2008 | Culp | G06K 13/07 400/247 |
| 2008/0206701 A1 * | 8/2008 | Miller | A61C 9/002 433/24 |
| 2008/0292741 A1 | 11/2008 | Wrosz et al. | |
| 2009/0065981 A1 * | 3/2009 | Polk, Jr. | B29C 51/08 264/553 |
| 2009/0246724 A1 * | 10/2009 | Chen | A61C 7/08 433/6 |
| 2009/0272073 A1 * | 11/2009 | Meyer | B65B 47/02 53/559 |
| 2009/0298018 A1 * | 12/2009 | Bublewitz | A61C 9/0006 433/215 |
| 2011/0277926 A1 | 11/2011 | Polk, Jr. | |
| 2012/0261847 A1 * | 10/2012 | Sirovskiy | B29B 13/023 264/16 |
| 2012/0270173 A1 * | 10/2012 | Pumphrey | A61C 7/08 433/6 |
| 2015/0314520 A1 | 11/2015 | Sirovskiy et al. | |
| 2020/0114546 A1 | 4/2020 | Sirovskiy et al. | |

FOREIGN PATENT DOCUMENTS

| | | |
|---|---|---|
| AU | 5598894 A | 6/1994 |
| CA | 1121955 A | 4/1982 |
| DE | 2749802 A1 | 5/1978 |
| DE | 69327661 T2 | 7/2000 |
| EP | 0091876 A1 | 10/1983 |
| EP | 0299490 A2 | 1/1989 |
| EP | 0376873 A2 | 7/1990 |
| EP | 0490848 A2 | 6/1992 |
| EP | 0541500 A1 | 5/1993 |

(56) References Cited

FOREIGN PATENT DOCUMENTS

| EP | 0529106 B1 | 10/1995 |
|---|---|---|
| EP | 0667753 B1 | 1/2000 |
| EP | 0774933 B1 | 12/2000 |
| EP | 0731673 B1 | 5/2001 |
| ES | 463897 A1 | 1/1980 |
| FR | 2369828 A1 | 6/1978 |
| FR | 2652256 A1 | 3/1991 |
| GB | 1550777 A | 8/1979 |
| JP | S5358191 A | 5/1978 |
| JP | H0428359 A | 1/1992 |
| JP | 08508174 | 9/1996 |
| JP | H08508174 A | 9/1996 |
| WO | WO-9008512 A1 | 8/1990 |
| WO | WO-9104713 A1 | 4/1991 |
| WO | WO-9410935 A1 | 5/1994 |
| WO | WO-9832394 A1 | 7/1998 |
| WO | WO-9844865 A1 | 10/1998 |
| WO | WO-9858596 A1 | 12/1998 |

OTHER PUBLICATIONS

Alcaniz, et al., "An Advanced System for the Simulation and Planning of Orthodontic Treatments," Karl Heinz Hohne and Ron Kikinis (eds.), Visualization in Biomedical Computing, 4th Intl. Conf., VBC '96, Hamburg, Germany, Sep. 22-25, 1996, Springer-Verlag, pp. 511-520.
Alexander et al., "The DigiGraph Work Station Part 2 Clinical Management," JCO, pp. 402-407 (Jul. 1990).
Altschuler, "3D Mapping of Maxillo-Facial Prosthesis," AADR Abstract #607, 2 pages total, (1980).
Altschuler et al., "Analysis of 3-D Data for Comparative 3-D Serial Growth Pattern Studies of Oral-Facial Structures," IADR Abstracts, Program and Abstracts of Papers, 57th General Session, IADR Annual Session, Mar. 29, 1979-Apr. 1, 1979, New Orleans Marriot, Journal of Dental Research, vol. 58, Jan. 1979, Special Issue A, p. 221.
Altschuler et al., "Laser Electro-Optic System for Rapid Three-Dimensional (3D) Topographic Mapping of Surfaces," Optical Engineering, 20(6):953-961 (1981).
Altschuler et al., "Measuring Surfaces Space-Coded by a Laser-Projected Dot Matrix," SPIE Imaging Applications for Automated Industrial Inspection and Assembly, vol. 182, p. 187-191 (1979).
Andersson et al., "Clinical Results with Titanium Crowns Fabricated with Machine Duplication and Spark Erosion," Acta. Odontol. Scand., 47:279-286 (1989).
Andrews, The Six Keys to Optimal Occlusion Straight Wire, Chapter 3, pp. 13-24 (1989).
Bartels, et al., An Introduction to Splines for Use in Computer Graphics and Geometric Modeling, Morgan Kaufmann Publishers, pp. 422-425 (1987).
Baumrind, "A System for Craniofacial Mapping Through the Integration of Data from Stereo X-Ray Films and Stereo Photographs," an invited paper submitted to the 1975 American Society of Photogram Symposium on Close-Range Photogram Systems, University of Ill., Aug. 26-30, 1975, pp. 142-166.
Baumrind et al., "A Stereophotogrammetric System for the Detection of Prosthesis Loosening in Total Hip Arthroplasty," NATO Symposium on Applications of Human Biostereometrics, Jul. 9-13, 1978, SPIE, vol. 166, pp. 112-123.
Baumrind et al., "Mapping the Skull in 3-D," reprinted from J. Calif. Dent. Assoc., 48(2), 11 pages total, (1972 Fall Issue).
Baumrind, "Integrated Three-Dimensional Craniofacial Mapping: Background, Principles, and Perspectives," Semin. in Orthod., 7(4):223-232 (Dec. 2001).
Begole et al., "A Computer System for the Analysis of Dental Casts," The Angle Orthod., 51(3):253-259 (Jul. 1981).
Bernard et al., "Computerized Diagnosis in Orthodontics for Epidemiological Studies: A Progress Report," Abstract, J. Dental Res. Special Issue, vol. 67, p. 169, paper presented at International Association for Dental Research 66th General Session, Mar. 9-13, 1988, Montreal, Canada.
Bhatia et al., "A Computer-Aided Design for Orthognathic Surgery," Br. J. Oral Maxillofac. Surg., 22:237-253 (1984).
Biggerstaff, "Computerized Diagnostic Setups and Simulations," Angle Orthod., 40(1):28-36 (Jan. 1970).
Biggerstaff et al., "Computerized Analysis of Occlusion in the Postcanine Dentition," Am. J. Orthod., 61(3): 245-254 (Mar. 1972).
Biostar Opeation & Training Manual. Great Lakes Orthodontics, Ltd. 199 Fire Tower Drive, Tonawanda, New York. 14150-5890, 20 pages total (1990).
Blu, et al., "Linear interpolation revitalized", IEEE Trans. Image Proc., 13(5):710-719 (May 2004.
Bourke, "Coordinate System Transformation," (Jun. 1996), p. 1, retrieved from the Internet Nov. 5, 2004, URL http://astronomy.swin.edu.au/-pbourke/prolection/coords.
Boyd et al., "Three Dimensional Diagnosis and Orthodontic Treatment of Complex Malocclusions With the Invisalign Appliance," Semin. Orthod., 7(4):274-293 (Dec. 2001).
Brandestini et al., "Computer Machined Ceramic Inlays: In Vitro Marginal Adaptation," J. Dent. Res. Special Issue, Abstract 305, vol. 64, p. 208 (1985).
Brook et al., "An Image Analysis System for the Determination of Tooth Dimensions from Study Casts: Comparison with Manual Measurements of Mesio-distal Diameter," J. Dent. Res., 65(3):428-431 (Mar. 1986).
Burstone et al., Precision Adjustment of the Transpalatal Lingual Arch: Computer Arch Form IN Predetermination, Am, Journal of Orthodontics, vol. 79, No. 2 (Feb. 1981), pp. 115-133.
Burstone (interview), "Dr. Charles J. Burstone on The Uses of the Computer in Orthodontic Practice (Part 1)," J. Clin. Orthod., 13(7):442-453 (Jul. 1979).
Burstone (interview), "Dr. Charles J. Burstone on The Uses of the Computer in Orthodontic Practice (Part 2)," J. Clin. Orthod., 13(8):539-551 (Aug. 1979).
Cardinal Industrial Finishes, Powder Coatings information posted at http://www.cardinalpaint.com on Aug. 25, 2000, 2 pages.
Carnaghan, "An Alternative to Holograms for the Portrayal of Human Teeth," 4th Int'l. Conf. on Holographic Systems, Components and Applications, Sep. 15, 1993, pp. 228-231.
Chaconas et al., "The DigiGraph Work Station, Part 1, Basic Concepts," JCO, pp. 360-367 (Jun. 1990).
Chafetz et al., "Subsidence of the Femoral Prosthesis, A Stereophotogrammetric Evaluation," Clin. Orthop. Relat. Res., No. 201, pp. 60-67 (Dec. 1985).
Chiappone, (1980). Constructing the Gnathologic Setup and Positioner, J. Clin. Orthod, vol. 14, pp. 121-133.
Cottingham, (1969). Gnathologic Clear Plastic Positioner, Am. J. Orthod, vol. 55, pp. 23-31.
Crawford, "CAD/CAM in the Dental Office: Does It Work?", Canadian Dental Journal, vol. 57, No. 2, pp. 121-123 (Feb. 1991).
Crawford, "Computers in Dentistry: Part 1 CAD/CAM: The Computer Moves Chairside, "Part 2 F. Duret—A Man with a Vision, Part 3 The Computer Gives New Vision—Literally," Part 4 Bytes 'N Bites—The Computer Moves from the Front Desk to the Operatory," Canadian Dental Journal, vol. 54 (9), pp. 661-666 (1988).
Crooks, "CAD/CAM Comes to USC," USC Dentistry, pp. 14-17 (Spring 1990).
Cureton, Correcting Malaligned Mandibular Incisors with Removable Retainers, J. Clin. Orthod, vol. 30, No. 7 (1996) pp. 390-395.
Curry et al., "Integrated Three-Dimensional Craniofacial Mapping at the Craniofacial Research Instrumentation Laboratory/University of the Pacific," Semin. Orthod., 7(4):258-265 (Dec. 2001).
Cutting et a/., "Three-Dimensional Computer-Assisted Design of Craniofacial Surgical Procedures: Optimization and Interaction with Cephalometric and CT-Based Models," Plast. 77(6):877-885 (Jun. 1986).
DCS Dental AG, "The CAD/CAM 'DCS Titan System' for Production of Crowns/Bridges," DSC Production AG, pp. 1-7 (Jan. 1992.

(56) References Cited

OTHER PUBLICATIONS

Definition for gingiva. Dictionary.com p. 1-3. Retrieved from the internet Nov. 5, 2004 http://reference.com/search/search?q=gingiva.
Defranco et al., "Three-Dimensional Large Displacement Analysis of Orthodontic Appliances," J. Biomechanics, 9:793-801 (1976).
Dental Institute University of Zurich Switzerland, Program for International Symposium JD on Computer Restorations: State of the Art of the CEREC-Method, May 1991, 2 pages total.
Dentrac Corporation, Dentrac document, pp. 4-13 (1992).
DENT-X posted on Sep. 24, 1998 at http://www.dent-x.com/DentSim.htm, 6 pages.
Doyle, "Digital Dentistry," Computer Graphics World, pp. 50-52, 54 (Oct. 2000).
DuraClearTM product information, Allesee Orthodontic Appliances—Pro Lab, 1 page (1997).
Duret et al., "CAD/CAM Imaging in Dentistry," Curr. Opin. Dent., 1:150-154 (1991).
Duret et al, "CAD-CAM in Dentistry," J. Am. Dent. Assoc. 117:715-720 (Nov. 1988).
Duret, "The Dental CAD/CAM, General Description of the Project," Hennson International Product Brochure, 18 pages total, Jan. 1986.
Duret, "Vers Une Prosthese Informatisee," (English translation attached), Tonus, vol. 75, pp. 55-57 (Nov. 15, 1985).
Economides, "The Microcomputer in the Orthodontic Office," JCO, pp. 767-772 (Nov. 1979).
Elsasser, Some Observations on the History and Uses of the Kesling Positioner, Am. J. Orthod. (1950) 36:368-374.
English translation of Japanese Laid-Open Publication No. 63-11148 to inventor T. Ozukuri (Laid-Open on Jan. 18, 1998) pp. 1-7.
Felton et al., "A Computerized Analysis of the Shape and Stability of Mandibular Arch Form," Am. J. Orthod. Dentofacial Orthop., 92(6):478-483 (Dec. 1987).
Friede et al., "Accuracy of Cephalometric Prediction in Orthognathic Surgery," Abstract of Papers, J. Dent. Res., 70:754-760 (1987).
Futterling et al., "Automated Finite Element Modeling of a Human Mandible with Dental Implants," JS WSCG '98—Conference Program, retrieved from the Internet: http://wscg.zcu.cz/wscg98/papers98/Strasser 98.pdf, 8 pages.
Gao et al., "3-D element Generation for Multi-Connected Complex Dental and Mandibular Structure," Proc. Intl Workshop on Medical Imaging and Augmented Reality, pp. 267-271 (Jun. 12, 2001).
Gim-Alldent Deutschland, "Das DUX System: Die Technik," 2 pages total (2002).
Gottleib et al., "JCO Interviews Dr. James A. McNamura, Jr., on the Frankel Appliance: Part 2: Clinical 1-1 Management," J. Clin. Orthod., 16(6):390-407 (Jun. 1982).
Grayson, "New Methods for Three Dimensional Analysis of Craniofacial Deformity, Symposium: JW Computerized Facial Imaging in Oral and Maxillofacial Surgery," AAOMS, 3 pages total, (Sep. 13, 1990).
Guess et al., "Computer Treatment Estimates In Orthodontics and Orthognathic Surgery," JCO, pp. 262-28 (Apr. 1989).
Heaven et al., "Computer-Based Image Analysis of Artificial Root Surface Caries," Abstracts of Papers, J. Dent. Res., 70:528 (Apr. 17-21, 1991).
Highbeam Research, "Simulating Stress Put on Jaw," Tooling & Production [online], Nov. 1996, n pp. 1-2, retrieved from the Internet on Nov. 5, 2004, URL http://static.highbeam.com/t/toolingampproduction/november011996/simulatingstressputonfa . . . .
Hikage, "Integrated Orthodontic Management System for Virtual Three-Dimensional Computer Graphic Simulation and Optical Video Image Database for Diagnosis and Treatment Planning", Journal of Japan KA Orthodontic Society, Feb. 1987, English translation, pp. 1-38, Japanese version, 46(2), pp. 248-269 (60 pages total).
Hoffmann, et al., "Role of Cephalometry for Planning of Jaw Orthopedics and Jaw Surgery Procedures," (Article Summary in English, article in German), Informationen, pp. 375-396 (Mar. 1991).
Hojjatie et al., "Three-Dimensional Finite Element Analysis of Glass-Ceramic Dental Crowns," J. Biomech., 23(11):1157-1166 (1990).
Huckins, "CAD-CAM Generated Mandibular Model Prototype from MRI Data," AAOMS, p. 96 (1999).
Important Tip About Wearing the Red White & Blue Active Clear Retainer System. Allesee Orthodontic Appliances—Pro Lab. 1 page (1998).
International search report and written opinion dated Jul. 20, 2012 for PCT/IB2012/000737.
JCO Interviews, "Craig Andreiko , DDS, MS on the Elan and Orthos Systems," JCO, pp. 459-468 (Aug. 1994).
JCO Interviews, "Dr. Homer W. Phillips on Computers in Orthodontic Practice, Part 2," JCO. 1997; 1983:819-831.
Jerrold, "The Problem, Electronic Data Transmission and the Law," AJO-DO, pp. 478-479 (Apr. 1988).
Jones et al., "An Assessment of the Fit of a Parabolic Curve to Pre- and Post-Treatment Dental Arches," Br. J. Orthod., 16:85-93 (1989).
JP Faber et al., "Computerized Interactive Orthodontic Treatment Planning," Am. J. Orthod., 73(1):36-46 (Jan. 1978).
Kamada et.al., Case Reports On Tooth Positioners Using LTV Vinyl Silicone Rubber, J. Nihon University School of Dentistry (1984) 26(1): 11-29.
Kamada et.al., Construction of Tooth Positioners with LTV Vinyl Silicone Rubber and Some Case KJ Reports, J. Nihon University School of Dentistry (1982) 24(1):1-27.
Kanazawa et al., "Three-Dimensional Measurements of the Occlusal Surfaces of Upper Molars in a Dutch Population," J. Dent Res., 63(11):1298-1301 (Nov. 1984).
Kesling, Coordinating the Predetermined Pattern and Tooth Positioner with Conventional Treatment, KN Am. J. Orthod. Oral Surg. (1946) 32:285-293.
Kesling et al., The Philosophy of the Tooth Positioning Appliance, American Journal of Orthodontics and Oral surgery. 1945; 31:297-304.
Kleeman et al., The Speed Positioner, J. Clin. Orthod. (1996) 30:673-680.
Kochanek, "Interpolating Splines with Local Tension, Continuity and Bias Control," Computer Graphics, ri 18(3):33-41 (Jul. 1984).
KM Oral Surgery (1945) 31 :297-30.
Kunii et al., "Articulation Simulation for an Intelligent Dental Care System," Displays 15:181-188 (1994).
Kuroda et al., Three-Dimensional Dental Cast Analyzing System Using Laser Scanning, Am. J. Orthod. Dentofac. Orthop. (1996) 110:365-369.
Laurendeau, et al., "A Computer-Vision Technique for the Acquisition and Processing of 3-D Profiles of 7 KR Dental Imprints: An Application in Orthodontics," IEEE Transactions on Medical Imaging, 10(3):453-461 (Sep. 1991.
Leinfelder, et al., "A New Method for Generating Ceramic Restorations: a CAD-CAM System," J. Am. 1-1 Dent. Assoc., 118(6):703-707 (Jun. 1989).
Manetti, et al., "Computer-Aided Cefalometry and New Mechanics in Orthodontics," (Article Summary in English, article in German), Fortschr Kieferorthop. 44, 370-376 (Nr. 5), 1983.
McCann, "Inside the ADA," J. Amer. Dent. Assoc., 118:286-294 (Mar. 1989).
McNamara et al., "Invisible Retainers," J. Clin. Orthod., pp. 570-578 (Aug. 1985).
McNamara et al., Orthodontic and Orthopedic Treatment in the Mixed Dentition, Needham Press, pp. 347-353 (Jan. 1993).
Moermann et al., "Computer Machined Adhesive Porcelain Inlays: Margin Adaptation after Fatigue Stress," IADR Abstract 339, J. Dent. Res., 66(a):763 (1987).
Moles, "Correcting Mild Malalignments—As Easy As One, Two, Three," AOA/Pro Corner, vol. 11, No. 1, 2 pages (2002).
Mormann et al., "Marginale Adaptation von adhasuven Porzellaninlays in vitro," Separatdruck aus: Schweiz. Mschr. Zahnmed. 95: 1118-1129, 1985.
Nahoum, "The Vacuum Formed Dental Contour Appliance," N. Y. State Dent. J., 30(9):385-390 (Nov. 1964).
Nash, "CEREC CAD/CAM Inlays: Aesthetics and Durability in a Single Appointment," Dent. Today, 9(8):20, 22-23 (Oct. 1990).

(56) References Cited

OTHER PUBLICATIONS

Nishiyama et al., "A New Construction of Tooth Repositioner by LTV Vinyl Silicone Rubber," J. Nihon Univ. Sch. Dent., 19(2):93-102 (1977).
Paul et al., "Digital Documentation of Individual Human Jaw and Tooth Forms for Applications in Orthodontics, Oral Surgery and Forensic Medicine" Proc. of the 24th Annual Conf. of the IEEE Industrial Electronics Society (IECON '98), Sep. 4, 1998, pp. 2415-2418.
Pinkham, "Foolish Concept Propels Technology," Dentist, 3 pages total, Jan./Feb. 1989.
Pinkham, "Inventor's CAD/CAM May Transform Dentistry," Dentist, 3 pages total, Sep. 1990.
Ponitz, "Invisible Retainers," Am. J. Orthod., 59(3):266-272 (Mar. 1971).
PROCERA Research Projects, "PROCERA Research Projects 1993—Abstract Collection," pp. 3-7; 28 (1993).
Proffit et al., Contemporary Orthodontics, (Second Ed.), Chapter 15, Mosby Inc., pp. 470-533 (Oct. 1993.
Raintree Essix & ARS Materials, Inc., Raintree Essix, Technical Magazine Table of contents and Essix Appliances, http://www.essix.com/magazine/defaulthtml Aug. 13, 1997.
Redmond et al., "Clinical Implications of Digital Orthodontics," Am. J. Orthod. Dentofacial Orthop., 117(2):240-242 (2000).
Rekow, "A Review of the Developments in Dental CAD/CAM Systems," (contains references to Japanese efforts and content of the papers of particular interest to the clinician are indicated with a one line summary of their content in the bibliography), Curr. Opin. Dent., 2:25-33 (Jun. 1992).
Rekow, "CAD/CAM in Dentistry: A Historical Perspective and View of the Future," J. Can. Dent. Assoc., 58(4):283, 287-288 (Apr. 1992).
Rekow, "Computer-Aided Design and Manufacturing in Dentistry: A Review of the State of the Art," J. Prosthet. Dent., 58(4):512-516 (Oct. 1987).
Rekow, "Dental CAD-CAM Systems: What is the State of the Art?", J. Amer. Dent. Assoc., 122:43-48 1991.
Rekow et al., "CAD/CAM for Dental Restorations—Some of the Curious Challenges," IEEE Trans. Biomed. Eng., 38(4):314-318 (Apr. 1991).
Rekow et al., "Comparison of Three Data Acquisition Techniques for 3-D Tooth Surface Mapping," Annual International Conference of the IEEE Engineering in Medicine and Biology Society, 13(1):344-345 1991.
Rekow, "Feasibility of an Automated System for Production of Dental Restorations, Ph.D. Thesis," Univ. of Minnesota, 244 pages total, Nov. 1988.
Richmond et al., "The Development of a 3D Cast Analysis System," Br. J. Orthod., 13(1):53-54 (Jan. 1986).
Richmond et al., "The Development of the PAR Index (Peer Assessment Rating): Reliability and Validity," Eur. J. Orthod., 14:125-139 (1992).
Richmond, "Recording The Dental Cast In Three Dimensions," Am. J. Orthod. Dentofacial Orthop., 92(3):199-206 (Sep. 1987).
Rudge, "Dental Arch Analysis: Arch Form, A Review of the Literature," Eur. J. Orthod., 3(4):279-284 1981.
Sakuda et al., "Integrated Information-Processing System In Clinical Orthodontics: An Approach with Use of a Computer Network System," Am. J. Orthod. Dentofacial Orthop., 101(3): 210-220 (Mar. 1992).
Schellhas et al., "Three-Dimensional Computed Tomography in Maxillofacial Surgical Planning," Arch. Otolaryngol Head Neck Surg., 114:438-442 (Apr. 1988).
Schroeder et al., Eds. The Visual Toolkit, Prentice Hall PTR, New Jersey (1998) Chapters 6, 8 & 9, (pp. 153-210, 309-354, and 355-428, respectively.
Shilliday, (1971). Minimizing finishing problems with the mini-positioner, Am. J. Orthod. 59:596-599.
Siemens, "CEREC—Computer-Reconstruction," High Tech in der Zahnmedizin, 14 pages total (2004).
Sinclair, "The Readers' Corner," J. Clin. Orthod., 26(6):369-372 (Jun. 1992).
Sirona Dental Systems GmbH, CEREC 3D, Manuel utiiisateur, Version 2.0X (in French), 2003,114 pages total.
Stoll et al., "Computer-aided Technologies in Dentistry," (article summary in English, article in German), Dtsch Zahna'rztl Z 45, pp. 314-322 (1990).
Sturman, "Interactive Keyframe Animation of 3-D Articulated Models," Proceedings Graphics Interface '84, May-Jun. 1984, pp. 35-40.
The Choice Is Clear: Red, White & Blue . . . The Simple, Affordable, No-Braces Treatment, Allesee Orthodontic Appliances—Pro Lab product information, 6 pages (2003).
The Choice Is Clear: Red, White & Blue . . . The Simple, Affordable, No-Braces Treatment, Allesee HI Orthodontic Appliances—Pro Lab product information for doctors. http://ormco.com/aoa/appliancesservices/RWB/doctorhtml, 5 pages (May 19, 2003).
The Choice is Clear: Red, White & Blue . . . The Simple, Affordable, No-Braces Treatment, Allesee HJ Orthodontic Appliances—Pro Lab product information for patients, (http://ormco.com/aoa/appliancesservices/RWB/patients.html), 2 pages (May 19, 2003).
The Red, White & Blue Way to Improve Your Smile!, Allesee Orthodontic Appliances—Pro Lab product information for patients, 2 pages (1992).
Truax L., "Truax Clasp-Less(TM) Appliance System," Funct. Orthod., 9(5):22-4, 26-8 (Sep.-Oct. 1992).
Tru-Tain Orthodontic & Dental Supplies, Product Brochure, Rochester, Minnesota 55902, 16 pages total (1996).
U.S. Department of Commerce, National Technical Information Service, "Automated Crown Replication Using Solid Photography SM," Solid Photography Inc., Melville NY, Oct. 1977, 20 pages total.
U.S. Department of Commerce, National Technical Information Service, "Holodontography: An Introduction to Dental Laser Holography," School of Aerospace Medicine Brooks AFB Tex, Mar. 1973, 37 pages total.
U.S. Appl. No. 60/050,342, filed Jun. 20, 1997, 41 pages total.
Van Der Linden, "A New Method to Determine Tooth Positions and Dental Arch Dimensions," J. Dent. Res., 51(4):1104 (Jul.-Aug. 1972).
Van Der Linden et al., "Three-Dimensional Analysis of Dental Casts by Means of the Optocom," J. Dent. Res., p. 1100 (Jul.-Aug. 1972).
Van Der Zel, "Ceramic-Fused-to-Metal Restorations with a New CAD/CAM System," Quintessence Int., 24(11):769-778 (1993.
Varady et al., "Reverse Engineering Of Geometric Models—An Introduction," Computer-Aided Design, 29(4):255-268,1997.
Verstreken et al., "An Image-Guided Planning System for Endosseous Oral Implants," IEEE Trans. Med. Imaging, 17(5):842-852 (Oct. 1998).
Warunek et al., Physical and Mechanical Properties of Elastomers in Orthodonic Positioners, Am J. Orthod. Dentofac. Orthop, vol. 95, No. 5, (May 1989) pp. 388-400.
Warunek et.al., Clinical Use of Silicone Elastomer Appliances, JCO (1989) XXIII(10):694-700.
Wells, Application of the Positioner Appliance in Orthodontic Treatment, Am. J. Orthodont. (1970) 58:351-366.
Williams, "Dentistry and CAD/CAM: Another French Revolution," J. Dent. Practice Admin., pp. 2-5 (Jan./Mar. 1987).
Williams, "The Switzerland and Minnesota Developments in CAD/CAM," J. Dent. Practice Admin., pp. 50-55 (Apr./Jun. 1987).
Wishan, "New Advances in Personal Computer Applications for Cephalometric Analysis, Growth Prediction, Surgical Treatment Planning and Imaging Processing," Symposium: Computerized Facial Imaging in Oral and Maxilofacial Surgery Presented on Sep. 13, 1990.
WSCG'98—Conference Program, "The Sixth International Conference in Central Europe on Computer Graphics and Visualization '98," Feb. 9-13, 1998, pp. 1-7, retrieved from the Internet on Nov. 5, 2004, URL(http://wscg.zcu.cz/wscg98/wscg98.h).
Xia et al., "Three-Dimensional Virtual-Reality Surgical Planning and Soft-Tissue Prediction for Orthognathic Surgery," IEEE Trans. Inf. Technol. Biomed., 5(2):97-107 (Jun. 2001).

(56) References Cited

OTHER PUBLICATIONS

Yamamoto et al., "Optical Measurement of Dental Cast Profile and Application to Analysis of Three-Dimensional Tooth Movement in Orthodontics," Front. Med. Biol. Eng., 1(2):119-130 (1988).
Yamamoto et al., "Three-Dimensional Measurement of Dental Cast Profiles and Its Applications to Orthodontics," Conf. Proc. IEEE Eng. Med. Biol. Soc., 12(5):2051-2053 (1990).
Yamany et al., "A System for Human Jaw Modeling Using Intra-Oral Images," Proc. of the 20th Annual Conf. of the IEEE Engineering in Medicine and Biology Society, Nov. 1, 1998, vol. 2, pp. 563-566.
Yoshii, "Research on a New Orthodontic Appliance: The Dynamic Positioner (D.P.); I. The D.P. Concept and Implementation of Transparent Silicone Resin (Orthocon)," Nippon Dental Review, 452:61-74 (Jun. 1980).
Yoshii, "Research on a New Orthodontic Appliance: The Dynamic Positioner (D.P.); II. The D.P. Manufacturing Procedure and Clinical Applications," Nippon Dental Review, 454:107-130 (Aug. 1980).
Yoshii, "Research on a New Orthodontic Appliance: The Dynamic Positioner (D.P.); III. The General Concept of the D.P. Method and Its Therapeutic Effect, Part 1, Dental and Functional Reversed Occlusion Case Reports," Nippon Dental Review, 457:146-164 (Nov. 1980).
Yoshii, "Research on a New Orthodontic Appliance: The Dynamic Positioner (D.P.); III.—The General Concept of the D.P. Method and Its Therapeutic Effect, Part 2. Skeletal Reversed Occlusion Case Reports," Nippon Dental Review, 458:112-129 (Dec. 1980).
You May Be A Candidate For This Invisible No-Braces Treatment, Allesee Orthodontic Appliances—Pro Lab product information for patients, 2 pages (2002).

\* cited by examiner

METHODS FOR THERMAL FORMING AN OBJECT

CROSS-REFERENCE

This application is a Continuation of U.S. application Ser. No. 14/796,824, filed Jul. 10, 2015, which is a Continuation of U.S. application Ser. No. 13/186,374, filed Jul. 19, 2011, now U.S. Pat. No. 9,108,338, issued Aug. 18, 2015, which claims the benefit of U.S. Provisional Application No. 61/475,212, filed Apr. 13, 2011, the contents of each of which are incorporated herein by reference in their entirety.

BACKGROUND OF THE INVENTION

The present invention relates to methods and systems for thermal forming an object. More specifically, the present invention relates to methods and systems for selectively heating a material to be disposed over or into a mold.

Various techniques for thermal forming objects are currently used in the art. These include thin-gauge thermal forming techniques, where thin sheets or films (usually having a thickness of less than 0.6 inches) of plastic are used to form relatively portable objects such as dishware, food packaging products, plastic blisters for packaging of pharmaceutical products, and the like. These also include thick-gauge thermal forming techniques, where thicker sheets (usually having a thickness greater than 1.2 inches) of plastic are used to form relatively bulky objects, such as cosmetic surfaces on automobiles, medical equipment, kitchen appliances, and the like.

In many techniques, the sheeted plastic material is first heated, and then formed into the shape of the desired object using a mold. Heating is typically done with a single unit including one or more heating coils. Numerous problems arise with uneven distributions of heat in many existing systems. In the case of a single heating coil, portions of the plastic located under the heating coil are heated to a much greater extent than portions of the plastic located away from the heating coil. In the case of multiple heating coils, portions of plastic located under the heating coils are heated to a greater extent than portions of the plastic located between heating coils.

Uneven heat distributions cause various problems in the thermal forming process. For example, the malleability of the heated plastic varies, resulting in inaccurate forming over a mold. For another example, portions of the heated plastic may be heated too much so as to provide a desired average heat and thus malleability to form the plastic over the mold, where the overheating causes deformations, weaknesses, etc. in the plastic composition. In applications which require high precision molds, such as in the formation of dental appliances that must accurately conform to a mold within a tolerance of mere micrometers, these problems create significant burdens and inefficiencies in the thermal forming process, and potentially deficiencies in product effectiveness.

Further, existing techniques do not take into consideration changes or differences in plastic and/or molds. That is, the same heating coils and amount of heat is produced even if the plastic sheets (or molds) provided at the input are changed (to be thicker or thinner) for forming different objects. In this case, suboptimal heating is performed on the subsequent sheets, resulting again in inefficiencies and product expansion limitations.

Accordingly, it is desirable to overcome such deficiencies so as to improve the quality of objects that are formed by thermal forming, increase the efficiency of manufacturing objects via thermal forming, reduce the amount of waste generated by current thermal forming systems and processes, and increase the number of applications for which a single thermal forming system may be used.

BRIEF SUMMARY OF THE INVENTION

The present invention provides methods, systems, and apparatus's for thermal forming an object by selectively heating a material to be disposed over or into a mold.

In one embodiment, a method, system, or apparatus for thermal forming an object is provided. The method can include providing a mold, for example, operatively coupled within a vacuum chamber. A material (e.g., plastic) may then be inserted into a heating area and heated using a plurality of independently controllable heat sources that heat different areas of the material. By independent control of the heat sources heating different areas, heating of the material can be improved or better tailored so as to, e.g., ensure better or more even distribution of heat across the entire material. The heated material may be disposed over or into at least a portion of the mold by, for example, creating a vacuum in the vacuum chamber.

For a fuller understanding of the nature and advantages of embodiments of the present invention, reference should be made to the ensuing detailed description and accompanying drawings. Other aspects, objects and advantages of the invention will be apparent from the drawings and detailed description that follows. However, the scope of the invention will be fully apparent from the recitations of the claims.

DETAILED DESCRIPTION OF THE INVENTION

Embodiments of the present invention provide methods and systems for thermal forming an object by selectively heating a material to be disposed over or into a mold.

In one embodiment, a method for thermal forming an object is provided. The method can include providing a mold operatively coupled to a vacuum chamber. A material (e.g., plastic, polymer sheet, toys, etc.) may then be inserted into a heating area and heated using a plurality of independently controllable heat sources that heat different areas of the material. By independent control of the heat sources heating different areas, heating of the material can be improved or better tailored, e.g., so as to ensure better or more even distribution of heat across the entire material. The heated material may be disposed over or into at least a portion of the mold by, for example, creating a vacuum in the vacuum chamber.

In another embodiment, a system for thermal forming an object is provided. The system includes a movable element operable to insert a material into a heating area. For example, the movable element may include rollers that transport the material through the heating area and to and through other elements of the system. The system also includes a heating unit operable to heat the material using a plurality of independently controllable heat sources that heat different areas of the material when the material is located in the heating area. The system may also include a controller electronically coupled to the heat sources for controlling an output of the heat sources. The system may further include an object forming element, operatively coupled to a mold, positioned to receive the heated material, and configured to dispose the heated material over or into at least a portion of the mold. In one embodiment, the object forming element includes a top chamber and a bottom chamber that may engage to form a vacuum chamber.

In yet another embodiment, a heating element is provided for heating a material used to form an object in a thermal forming process. The heating element includes a plurality of independently controllable heat sources operable to heat different portions of the material. The heat sources may include, for example, carbon emitters. The heating element also includes at least one temperature sensor for monitoring a temperature of one or more portions of the material. The temperature sensor may include, for example, an infrared temperature sensor disposed on a side of the material opposite a side which the heat sources are disposed. The heating element may also include a control device electrically coupled to the heat sources and the temperature sensor for controlling the heat sources based on the monitored temperature. By monitoring the temperature and controlling the heat sources based on the monitored temperature, heating of the material can be narrowly tailored so as to ensure an even distribution of heat across select, desired portions of the material.

Figure 1:
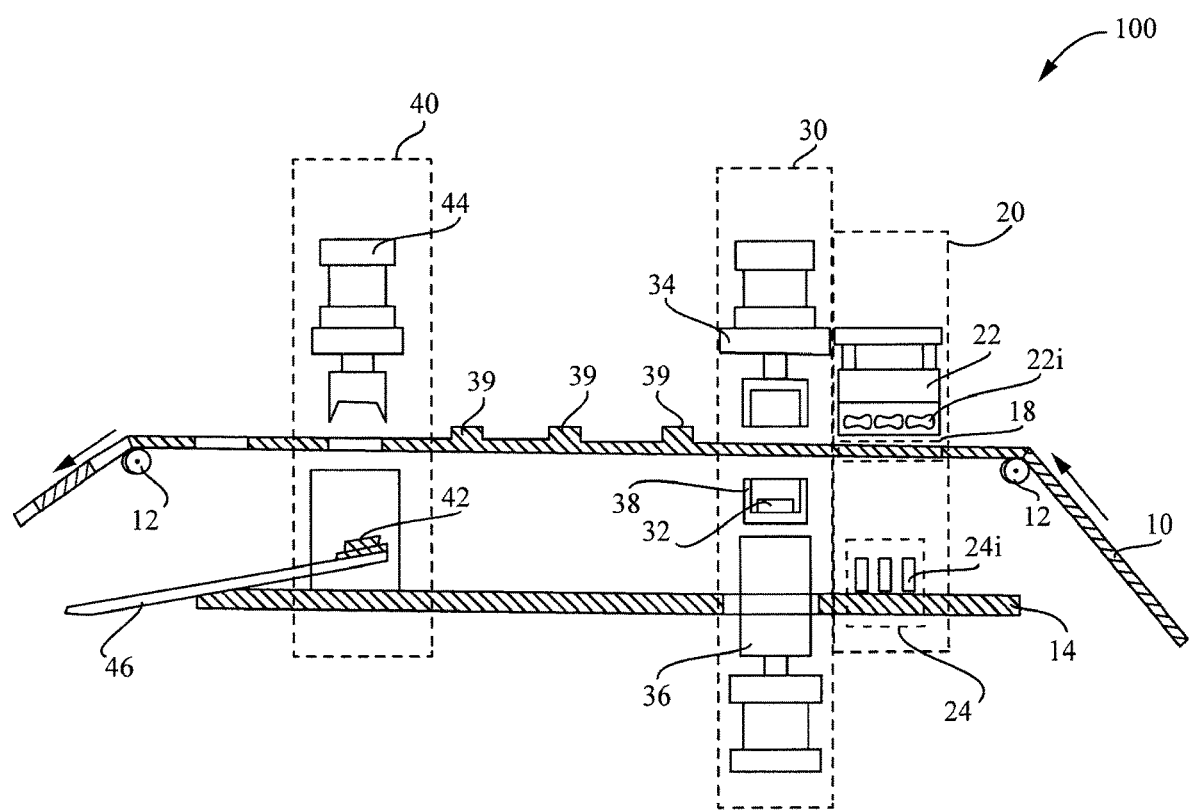
FIG. 1 shows a system for thermal forming an object according to an embodiment of the present invention.

FIG. 1 shows a system 100 for thermal forming an object according to an embodiment of the present invention. System 100 includes a material 10 to be formed into an object, a movable element 12 for moving material 10, and a supporting member 14 for physically supporting various elements of the system 100. System 100 also includes a heating element 20 for selectively heating material 10. Heating element 20 includes a heating unit 22 for heating material 10, and a temperature sensor 24 for monitoring a temperature of material 10. System 100 further includes an object forming element 30 for disposing the heated material 10 over or into at least a portion of a mold 32. Object forming element 30 includes a top chamber 34, a bottom chamber 36 and a mold carrier 38, and causes deformed portions 39 to be formed in material 10. System 100 also includes an extracting element 40 for extracting an object 42 from material 10. Extracting element 40 includes a trimmer 44 and a slide 46.

Each of these elements and their functionality will now be discussed in further detail. Material 10 is any suitable material for thermal forming an object; that is, material 10 is any material that becomes malleable in response to a heat treatment. Material 10 may be, for example, elastomeric polymeric material, such as Tru-Train (e.g., 0.03 inch) thermal forming dental material (Tru-Train Plastics, Rochester, Minn.). Material 10 may be provided in a continuous sheet that is sourced from a spool, roll, or the like (not shown), or may be provided in pre-cut portions, where the pre-cut portions are size to fit, for example, object forming element 30. Material 10 may have any suitable shape (e.g., rectangular, square, circular, oval) and thickness (e.g., 0.01 inch, 0.03 inch, 0.05 inch, in the range of 0.01 inch to 0.05 inch; 0.1 inch, 0.12 inch, 0.14 inch, in the range of 0.1 inch to 0.14 inch, or less than 0.1 inch, in the range of 0.05 inch to 0.1 inch, or greater than 0.14 inch). Material 10 can have a substantially uniform thickness across a portion of material 10 and/or a varying thickness across a portion of material 10.

Movable element 12 is any suitable system or device operable to insert material 10 into a heating area 18. Movable element 12 may also be operable to insert material 10 into other portions of system 100, such as object forming element 30 and extracting element 40. In one embodiment, moveable element 12 may include one or more rotatable spools or rolls. Material 10 may contact the rotatable spools, and be caused to move in response to rotation of the rotatable spools. One spool may be arranged for receiving material 10 prior to material 10 entering heating area 18, and another spool may be arranged for receiving material 10 after heating and cutting. Material 10 may be tensed between the spools in operation such that, at least in operation, material 10 is substantially planar between the spools. By the arrangement and rotation of the spools, material 10 may be fed into and through each of heating element 20, object forming element 30, and extracting element 40.

In another embodiment, movable element 12 may include indexing chains (not shown) that use pins, spikes, or other engaging features that pierce and transport material 10. The indexing chains may extend between the various elements of system 100. Similar to the embodiment discussed above, the indexing chains may be operable to feed material 10 into and through each of heating element 20, object forming element 30, and extracting element 40. In yet another embodiment, movable element 12 may include separate portions for inserting material 10 into one or more of heating element 20, object forming element 30, and extracting element 40. For example, material 10 may be precut, and a portion of movable element 12 may operate to dispose the precut portion of material 10 into heating area 18. The same or a different portion of movable element 12 may then operate to transfer the heated precut portion of material 10 from heating area 18 to object forming element 30, where a deformed portion 39 of material 10 is then formed. The same or a different portion of movable element 12 may then operate to transfer deformed portion 39 from object forming element 30 to extracting element 40, where the deformed portion 39 may subsequently be extracted from the material 10.

Supporting member 14 is any suitable apparatus for physically supporting and/or positioning various elements of system 100. For example, supporting member 14 may be a solid object for directly or indirectly supporting and positioning at least one of temperature sensor 24, bottom chamber 36, mold carrier 38, and slide 46. Supporting member 14 may also include portions (not shown) for directly or indirectly supporting and positioning other elements of system 100, such as heating unit 22, top chamber 34, and trimmer 44.

Heating element 20 is any suitable system or device for generating a heating area 18 in which portions of material 10 may be heated. In one embodiment, material 10 is passed through heating element 20 by, e.g., rotation of movable element 12. Material 10 may be continuously passed through heating element 20 or, in some embodiments, a portion of material 10 may be moved to a location proximate to heating element 20, stopped for an amount of time, and then moved to a location proximate other elements of system 100, such as object forming element 30.

Heating element 20 includes a heating unit 22 and a temperature sensor 24. Heating unit 22 is any suitable system or device for directing heat to heating area 18. Heating unit 22 may include one or more heat sources 22i, or heat sources 22i may be provided external to heating unit 22. Heat sources 22i may be any suitable heat source. For example, heat sources 22i may generate heat by conducting electricity through a resistor, burning gas or other flammable material, generating electromagnetic radiation, etc. Heating unit 22 may be stationary or movable, such that heat may be directed to one or more portions of heating area 18 using a single heat source 22i. Heating element 20 including heating unit 22 is further discussed with reference to FIGS. 2A to 6.

Temperature sensor 24 is any suitable system or device for measuring a temperature of one or more portions of material 10 located in heating area 18, and may comprise one or more temperature sensing elements 24i. In one embodiment, temperature sensing elements 24i are non-contact sensors, in that a temperature of material 10 may be determined without the sensor contacting material 10. For example, temperature sensing elements 24i may be radiation thermometers (such as a pyrometer, infrared thermal imaging camera, line-measuring thermometer, infrared radiation thermometer, etc.), thermal imagers, radio thermometers, optical pyrometers, fiber optic temperature sensors, etc. In another embodiment, temperature sensing elements 24i are contact sensors, in that a temperature of material 10 is determined by contacting material 10. For example, temperature sensing elements 24i may be thermocouples, thermistors, liquid-in-glass thermometers, resistance temperature detectors, filled system thermometers, bimetallic thermometers, semiconductor temperature sensors, etc. Temperature sensing elements 24i may include any combination of the above. Heating element 20 including temperature sensing elements 24i is further discussed with reference to FIGS. 2A to 6.

Object forming element 30 is any suitable system or device for disposing heated material 10 over or into at least a portion of a mold 32. Object forming element 30 may receive a portion of material 10 after the portion has been heated by heating element 20. Object forming element 30 may be operatively coupled to mold 32, and operate to dispose the heated portion of material 10 over or into at least a portion of mold 32. Since the heated portion of material 10 is malleable due to the heat treatment, the heated portion of material 10 forms around the contours of mold 32. As a result, deformed portions 39 of material 10 are formed, where deformed portions 39 are shaped to receive mold 32.

In one embodiment, object forming element 30 forms a vacuum so that portions of material 10 are sucked to the inner and/or outer surfaces of mold 32. In this embodiment, object forming element 30 may include top chamber 34 and bottom chamber 36. One or more molds such as mold 32 may be supported by one or more of top chamber 34 and bottom chamber 36. Here, mold 32 is supported by bottom chamber 36. A heated portion of material 10 may be moved to a location between top chamber 34 and bottom chamber 36. Once positioned, movement of material 10 may be stopped. At that point, top chamber 34 and bottom chamber 36 may close towards one another and, together with the heated portion of material 10 located between them, form a sealed chamber. A vacuum may then be formed in the sealed chamber that removes air trapped in the sealed chamber thereby causing the portion of material 10 disposed in the chamber to be pulled over or into mold 32. In another embodiment, object forming element 30 may not form a vacuum. Rather, a portion of material 10 may be pressed over mold 32.

Mold 32 is any suitable mold for forming an object. Mold 32 may be a positive or male mold (where material 10 is formed over mold 32) or may be a negative or female mold (where material 10 is formed inside mold 32). Mold 32 may be made of any suitable solid material, such as metal, silicon, glass, etc. Mold 32 may have any suitable shape. In one embodiment, mold 32 has the shape of a person's teeth (i.e., a physical tooth model). In other embodiments, mold 32 assumes other shapes, such as shapes corresponding to disposable cups, containers, lids, trays, blisters, clamshells, other products for the food, medical, and general retail industries, vehicle door and dash panels, refrigerator liners, utility vehicle beds, plastic pallets, etc.

Extracting element 40 is any suitable system or device for extracting an object 42 from material 10. Extracting element 40 may receive deformed portions 39 of material 10 from object forming element 30, where each deformed portion 39 has a desired shape of object 42. Upon receiving a deformed portion 39, extracting element 40 may remove deformed portion 39 from material 10, thereby providing object 42. Object 42 may be in the shape of a desired object. In some embodiments, object 42 may include residue material that may be further trimmed so as to result in the shape of the desired object.

In one embodiment, extracting element 40 includes a trimmer 44. Trimmer 44 includes cutting edges. Deformed portion 39 may be disposed proximate to the cutting edges of trimmer 44. Trimmer 44 may engage material 10, such that the cutting edges of trimmer 44 physically separate deformed portion 39 from material 10. The separated deformed portions 39 constitute objects 42. In another embodiment, extracting element 40 also includes a slide 46. Slide 46 may be any suitable system or device for receiving and, in some embodiments, transporting objects 42. In one embodiment, slide 46 is an angled member that receives object 42 and causes object 42 to move to a desired location by force of gravity. In other embodiments, different methods of cutting or trimming can be used, including, e.g., automated or manual trimming (or a combination thereof), applying one or more cutting edges, laser trimming or scoring, and the like.

Object 42 may be any object having a desired shape. In one embodiment, object 42 is a patient-removable orthodontic appliance designed to restrain and/or reposition a patient's teeth from a first tooth arrangement (e.g., an initial tooth arrangement) to a second tooth arrangement (e.g., a planned, target, intermediate, or final tooth arrangement). The appliance may be worn by a patient in order to restrain and/or reposition the patient's teeth. The appliance may comprise a shell (e.g., a polymeric shell) or a shell portion defining a plurality of tooth-receiving cavities that are shaped to receive and apply a resilient positioning force for restraining and/or repositioning the teeth. An appliance can fit over all teeth present in an upper or lower jaw, or less then all of the teeth. In some cases, only certain teeth received by an appliance will be repositioned by the appliance while other teeth can provide a base or anchor region for holding the appliance in place as it applies force against the tooth or teeth targeted for repositioning. In some cases, many or most, and even all, of the teeth will be repositioned at some point during an orthodontic treatment. Exemplary appliances, including those utilized in the Invisalign® System, are described in numerous patents and patent applications assigned to Align Technology, Inc. including, for example in U.S. Pat. Nos. 6,450,807, and 5,975,893, and U.S. patent application Ser. No. 12/633,715 all which are incorporated by reference herein in their entirety, as well as on the company's website, which is accessible on the World Wide Web (see, e.g., the URL "align.com"). In other embodiments, object 42 may be other types of orthodontic appliances, such as a retainer or tracking template.

System 100 in one embodiment is a thermal forming system including elements for heating material, forming objects in the material, and removing the objects from the material. However, it will be appreciated by those of ordinary skill in the art that such a system could operate equally well in a system having fewer or a greater number of components than are illustrated in FIG. 1. Thus, the depiction of system 100 in FIG. 1 should be taken as being illustrative in nature, and not limiting to the scope of the disclosure.

Figure 2A:
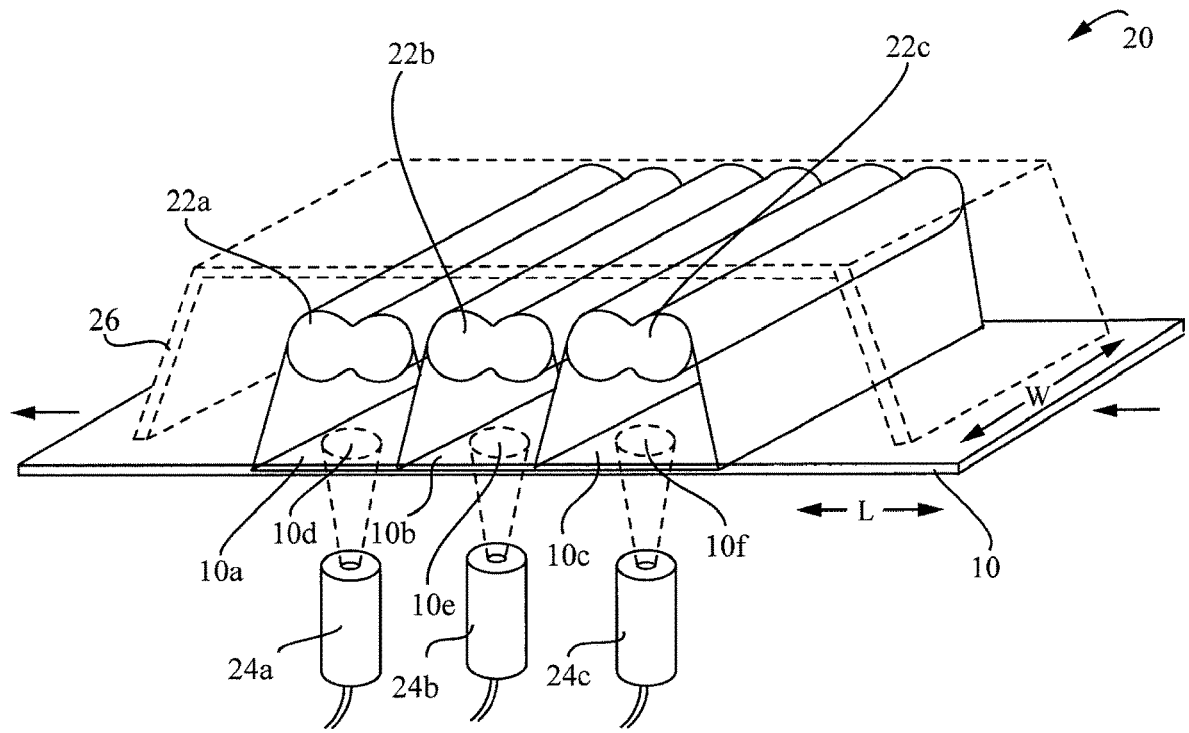
FIG. 2A is a perspective view of a simplified heating element according to a first embodiment.

FIGS. 2A-4B show a simplified heating element 20 according to various embodiments. FIG. 2A is a perspective view of a simplified heating element 20 according to a first embodiment. Heating element 20 includes a plurality of heat sources 22a, 22b, 22c, that are operable to generate and direct heat toward material 10 such that a first portion 10a, second portion 10b, and third portion 10c are respectively heated, where first portion 10a, second portion 10b, and third portion 10c are different from one another.

Heat sources 22a, 22b, 22c may be any suitable system or device for providing heat as previously discussed. In this embodiment, heat sources 22a, 22b, 22c are carbon heaters. Heat sources 22a, 22b, 22c have elongated shapes such that they extend entirely across a width W of material 10. Heat sources 22a, 22b, 22c are arranged parallel to each other in a line corresponding to a direction of a length L of material 10. Heat sources 22a, 22b, 22c are sized so that the heated portions of material 10a, 10b, and 10c constitute at least the entire amount of material 10 used to form object 42 (FIG. 1). Each of heat sources 22a, 22b, 22c is independently controllable so that an amount of heat directed toward material 10 from each heat source is controllable and, as a result, the heat of each of the first portion 10a, second portion 10b, and third portion 10c is controllable.

In one embodiment, an output of one or more of heat sources 22a, 22b, 22c may be controlled. For example, a voltage applied to one or more heat sources 22a, 22b, 22c may be increased or decreased to cause a corresponding increase or decrease in heat generated by one or more of heat sources 22a, 22b, 22c. In another embodiment, a direction of heat communicated by one or more of heat sources 22a, 22b, 22c may be controlled. For example, an orientation of the heat source itself may be adjusted so as to redirect the heat generated by the heat source. For another example, heat directing panels associated with the heat source may be adjusted so as to redirect the heat generated by the heat source. In yet another embodiment, both an output and heat direction of one or more heat sources 22a, 22b, 22c may be controlled.

Temperature sensor 24 in this embodiment includes multiple temperature sensing elements 24a, 24b, 24c. Temperature sensing elements 24a, 24b, 24c may be any suitable system or device for sensing a temperature of material 10 as previously discussed. In this embodiment, temperature sensing elements 24a, 24b, 24c are infrared temperature sensors. Temperature sensing elements 24a, 24b, 24c are operable to sense a temperature of third portion 10d of material 10, fourth portion 10e of material 10, and fifth portion 10f of material 10, respectively. In some embodiments, the temperature sensed portions (10d, 10e, 10f) of material are the same size or larger than the heated portions (10a, 10b, 10c) of material 10. In this embodiment, the temperature sensed portions (10d, 10e, 10f) of material are smaller than the heated portions (10a, 10b, 10c) of material 10.

Temperature sensing elements 24a, 24b, 24c may be provided at any suitable location for measuring a temperature of heated material 10 that is to be used for forming object 42. For example, they may be provided at edges of material 10, in the middle of a width W of material 10, or at other locations along width W. Where multiple temperature sensors are provided, they may be disposed along the length L of material 10 at any suitable distance. In this embodiment, each temperature sensing element (24a, 24b, 24c) corresponds to a heat source (22a, 22b, 22c) and is located opposite a position of the corresponding heat source (22a, 22b, 22c).

Any suitable number of temperature sensing elements 24a, 24b, 24c may be provided for measuring a temperature of heated material 10 that is to be used for forming object 42. For example, a single temperature sensor could be provided, or multiple temperature sensors could be provided. In this embodiment, three temperature sensors are provided, where each temperature sensing element (24a, 24b, 24c) corresponds to a single heat source (22a, 22b, 22c).

In one embodiment, areas of material 10 for which a temperature is measured by a temperature sensor does not change. For example, the temperature sensor may be stationary. In another example, areas of material 10 for which a temperature is measured by a temperature sensor are variable. For example, the temperature sensor may be coupled to and controllable by a motor, actuator, or the like so as to control an orientation of the temperature sensing element.

In this embodiment, heating element 20 also includes a housing 26. Housing 26 operates to at least partially house heat sources 22a, 22b, 22c and, in some cases, reflect heat generated by heat sources 22a, 22b, 22c toward material 10. Housing 26 may insulate or conduct heat, and may be made of any suitable material for doing so such as metals, polymers, minerals, concrete, etc.

Further in this embodiment, heat sources 22a, 22b, 22c are all of the same size, shape, and type. However, in other embodiments, one or more of heat sources 22a, 22b, 22c may have a different size, shape, and/or type. For example, heat sources 22a, 22c may be smaller than heat element 22b. Accordingly, heat sources 22a, 22b, 22c may heat different amounts of material 10, in heat patterns having different shapes, and/or using different heating technology. Similarly, in this embodiment, temperature sensing elements 24a, 24b, 24c are all of the same size, shape, and type. However, in other embodiments, one or more of temperature sensing elements 24a, 24b, 24c may have a different size, shape, and/or type. For example, temperature sensor 24b may sense a temperature of a larger portion of material 10 than temperature sensing elements 24a, 24c. Accordingly, temperature sensing elements 24a, 24b, 24c may sense temperature for different amounts of material 10, in temperature-sensing patterns having different shapes, and/or using different temperature sensing technology.

In operation, material 10 (or a portion of material 10) is inserted into heating area 18 (FIG. 1). Heating area 18 in this embodiment corresponds to areas of material 10 that are heated in response to activating heat sources 22a, 22b, 22c. In this embodiment, material 10 is fed into heating area 18 such that a portion of material 10 will be heated in response to activating heat sources 22a, 22b, 22c. After material 10 is positioned into heating area 18, the positioned material is held stationary. This stationary position may coincide with extracting element 40 controlling trimmer 44 to extract a previously formed object 42 from material 10 (FIG. 1). At that time, one or more of heat sources 22a, 22b, 22c are activated so as to heat portions 10a, 10b, 10c of material 10. During heating, temperature sensing elements 24a, 24b, 24c operate to measure a temperature of different portions 10d, 10e, 10f of material 10. These temperature measurements are then fed back to a controller (not shown) that operates to control an output of heat sources 22a, 22b, 22c. Heat sources 22a, 22b, 22c may thus be selectively controlled so that the temperatures at different areas of material 10 selectively reach a desired temperature. In one embodiment, the temperatures of portions 10a, 10b, 10c may be controlled to simultaneously reach a desired temperature. In another embodiment, the temperatures of portions 10a, 10b, 10c may be controlled to reach a desired temperature at different times. Once the heated portion(s) of material 10 has been heated to a desired temperature(s), the heated portion(s) may be transported to object forming element 30 (FIG. 1) so as to deform the heated portion(s).

Figure 2B:
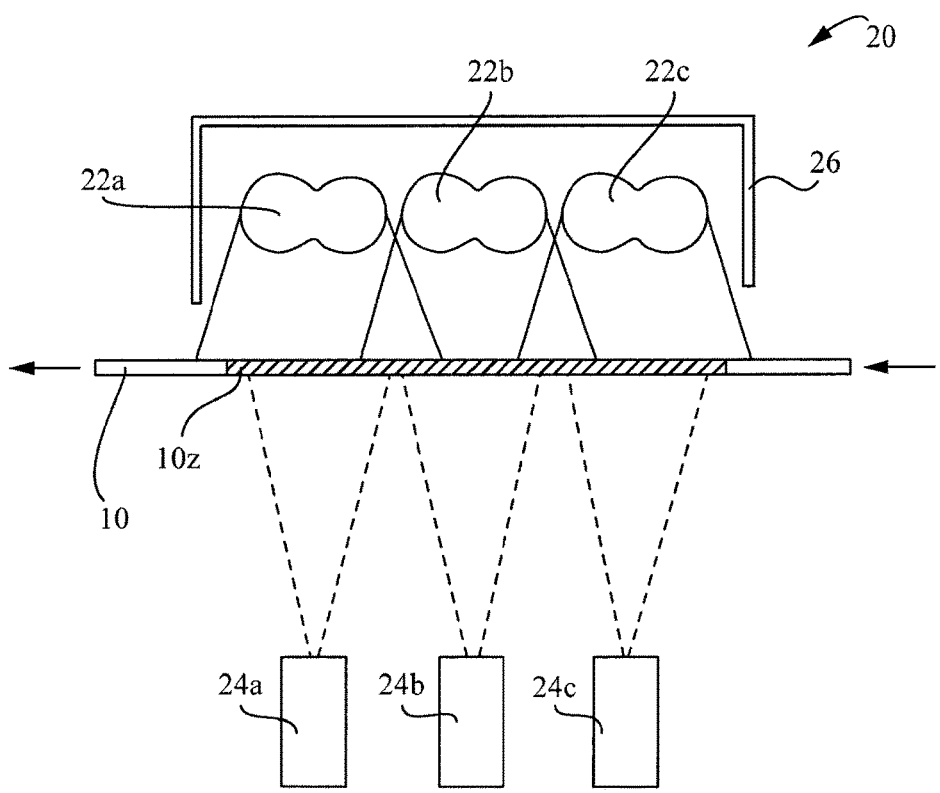
FIG. 2B is a side view of the simplified heating element shown in FIG. 2A.

FIG. 2B is a side view of the simplified heating element 20 shown in FIG. 2A. From the side view it is apparent that an object portion 10z of material is provided, where object portion 10z is to be used for subsequently forming object 42 (FIG. 1). Object portion 10z may be any suitable size and any suitable shape for subsequently forming object 42. For example, object portion 10z may be square, rectangular, circular, oval, etc. Here, object portion 10z is smaller than portions of material 10 that are heated by heat sources 22a, 22b, 22c. However, in some embodiments, object portion 10z may be the same size or larger than portions of material 10 that are heated by heat sources 22a, 22b, 22c. Further, according to this embodiment, object portion 10z is larger than portions of material 10 that are temperature sensed by temperature sensing elements 24a, 24b, 24c. However, in some embodiments, object portion 10z may be the same size or smaller than portions of material 10 that are temperature sensed by temperature sensing elements 24a, 24b, 24c.

Figure 3A:
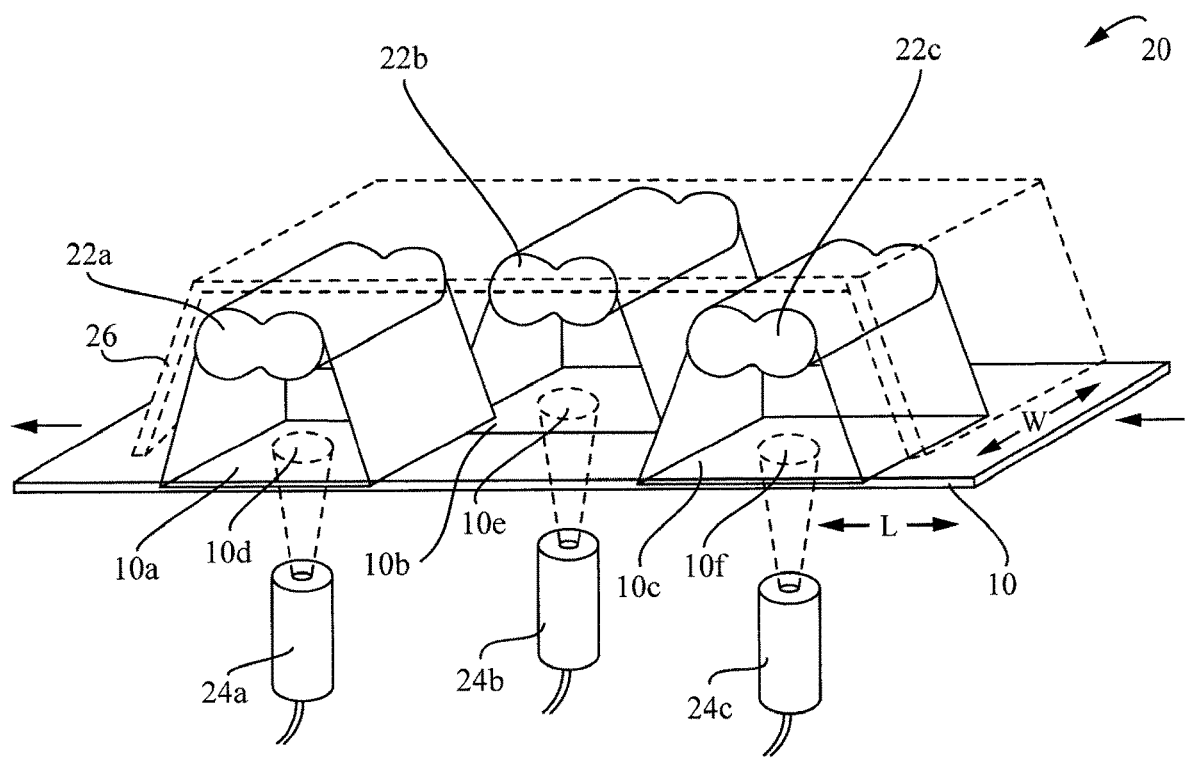
FIG. 3A is a perspective view of a simplified heating element according to a second embodiment.

FIG. 3A is a perspective view of a simplified heating element 20 according to a second embodiment. The features discussed with reference to FIGS. 2A and 2B are equally applicable in this embodiment, with the following exceptions. In this embodiment, heat sources 22a, 22b, 22c do not extend entirely across a width W of material 10. Rather, heat sources 22a, 22b, 22c extend only partially across the width W. Further, heat sources 22a, 22b, 22c are staggered across length L. That is, heat sources 22a, 22c are disposed over a first half of width W, and heat element 22b is disposed over a second half of width W different than the first half. By one or more of their size and positioning, heat sources 22a, 22b, 22c are disposed so that object portion 10z (FIG. 3B), which is used for subsequently forming object 42, may include both heated portions and non-heated portions.

In this embodiment, temperature sensing elements 24a, 24b, 24c are also staggered. Temperature sensing elements 24a, 24b, 24c are located such that temperature sensed portions 10d, 10e, 10f of material 10 correspond to heated portions 10a, 10b, 10c. Here, temperature sensed portions 10d, 10e, 10f only sense heated portions of material 10. However, in some embodiments, one or more temperature sensed portions 10d, 10e, 10f may include non-heated portions of material 10. In some embodiments, one or more of temperature sensed portions 10d, 10e, 10f may include only non-heated portions of material 10.

Figure 3B:
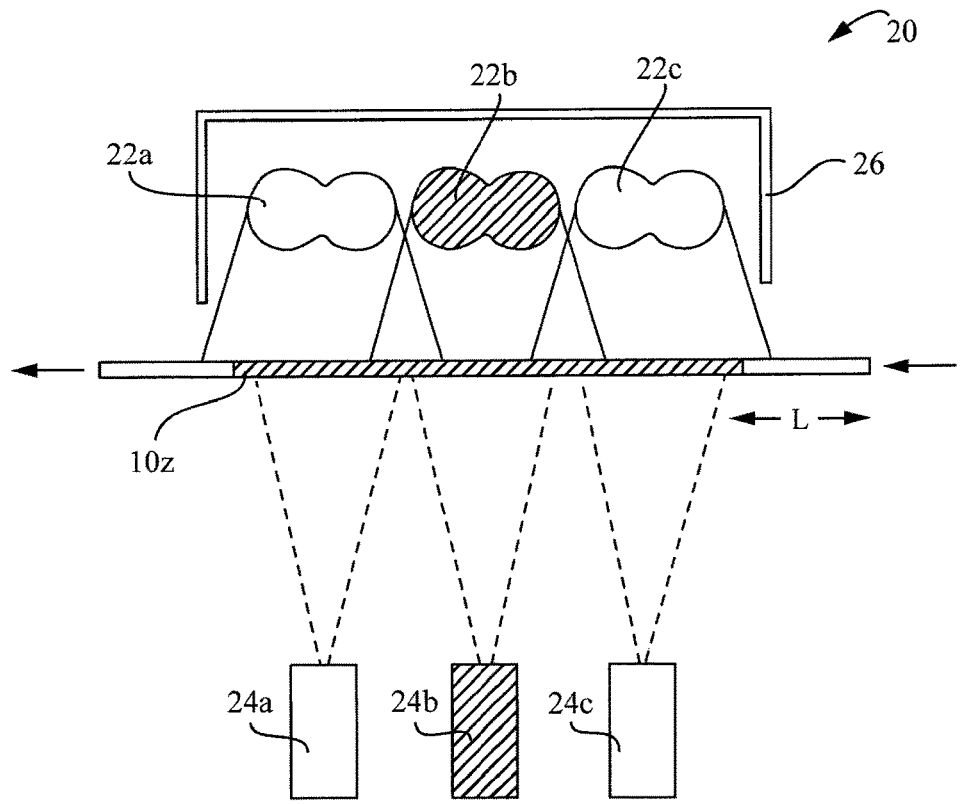
FIG. 3B is a side view of the simplified heating element shown in FIG. 3A.

FIG. 3B is a side view of the simplified heating element 20 shown in FIG. 3A. From the side view it is apparent that, even when heat sources 22a, 22b, 22c operate to generate heated portions of material 10 with non-heated portions remaining, object portion 10z may extend across a length L of material including both heated and non-heated portions of material 10.

Figure 4A:
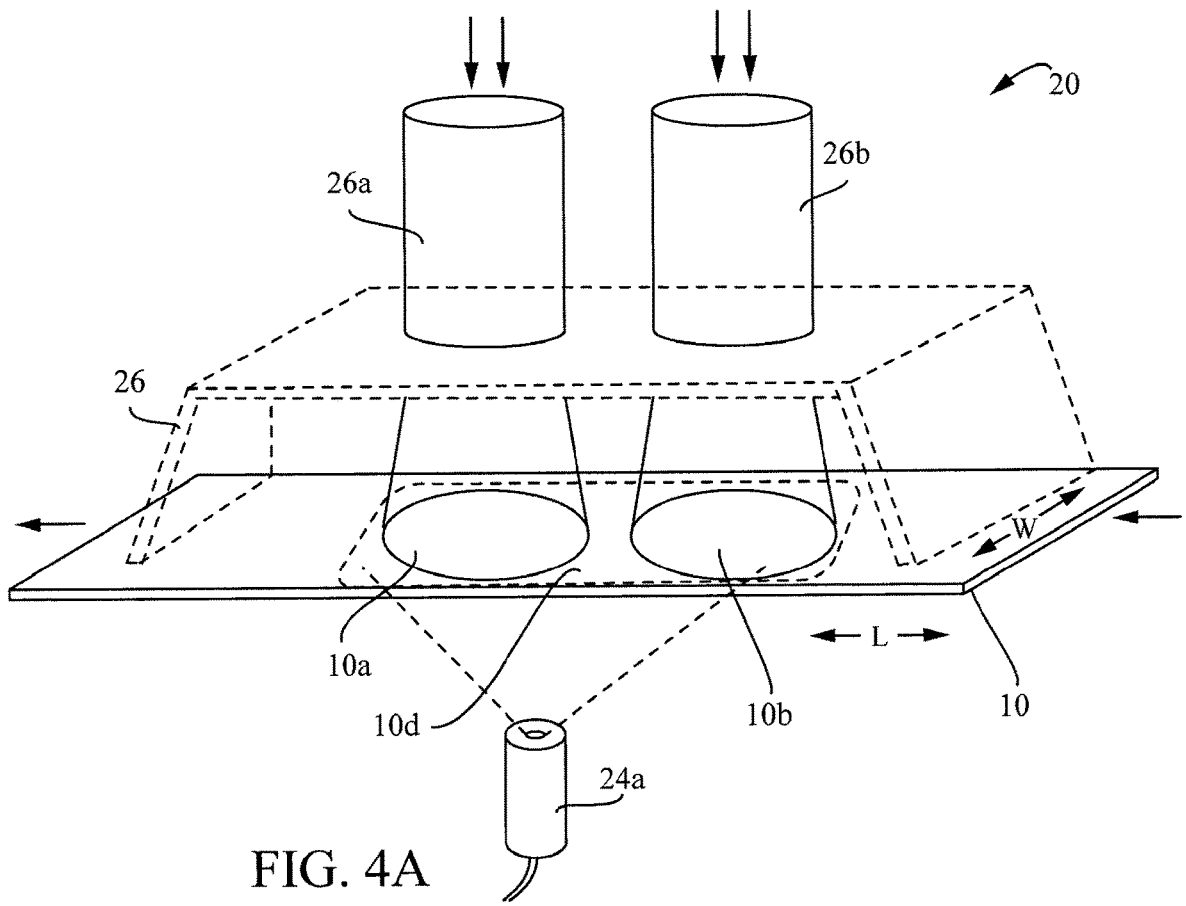
FIG. 4A is a perspective view of a simplified heating element according to a third embodiment.

FIG. 4A is a perspective view of a simplified heating element 20 according to a third embodiment. The features discussed with reference to FIGS. 2A to 3B are equally applicable in this embodiment, with the following exceptions. In this embodiment, the heat sources (not shown) are external and generate heat that is directed by housing 26.

Housing 26 in this embodiment includes heat directing chambers 26a, 26b. Heat directing chambers 26a, 26b are defined by walls of housing 26. Heat is provided from one or more external heat sources and, at least as illustrated in FIG. 4A, enters apertures provided at a top of heat directing chambers 26a, 26b. Heat directing chambers 26a, 26b then operate to direct the heat toward material 10 so as to heat portions 10a, 10b of material 10. The heat directed by heat directing chambers 26a, 26b may be generated by any suitable source, as previously discussed.

In one embodiment, an orientation of one or more of heat directing chambers 26a, 26b is fixed. For example, heat directing chambers 26a, 26b may be formed as a single unit with housing 26. In another embodiment, an orientation of one or more of heat directing chambers 26a, 26b is variable. For example, heat directing chambers 26a, 26b may not form a single unit with housing 26, but rather may be coupled to and controllable by motors, actuators, and the like.

In this embodiment, two heat chambers are provided. However, in other embodiments, one or more heat chambers may be provided. In this embodiment, heat chambers 26a, 26b are cylindrical in shape. However, heat chambers 26a, 26b may have any suitable shape, including shapes having cross-sections that are square, rectangular, trapezoidal, circular, oval, etc. Heat chambers 26a, 26b are all of the same size and shape in this embodiment. However, in other embodiments, heat chambers 26a, 26b may have a different size or shape. For example, heat chamber 26a may be larger than heat chamber 26b.

Further in this embodiment, only a single temperature sensing element 24a is provided. Accordingly, temperature sensing element 24a is operable to measure a temperature of a single portion 10d of material 10. Temperature sensed portion 10d in this embodiment fully encompasses the heated portions 10a, 10b of material 10. However, in other embodiments, temperature sensed portion 10d may only encompass a portion of one or more of heated portions 10a, 10b, or none of heated portions 10a, 10b.

Figure 4B:
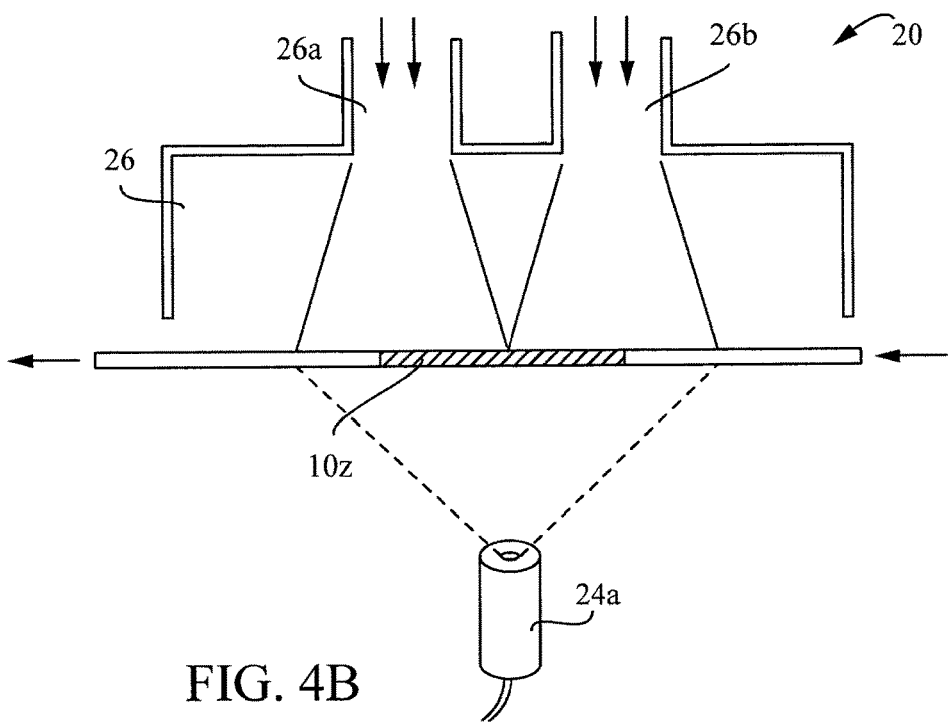
FIG. 4B is a side view of the simplified heating element shown in FIG. 4A.

FIG. 4B is a side view of the simplified heating element 20 shown in FIG. 4A. From the side view it is apparent that a single temperature sensing element 24a is operable to sense the temperature of a portion of material 10 including object portion 10z. It is further apparent that the portions of material 10 heated by heat directed through heat directing chambers 26a, 26b may not overlap along the length L of material 10. However, in other embodiments, such portions may partially or fully overlap with one another.

FIGS. 2A to 4B show various embodiments of a simplified heating element 20. However, it will be appreciated by those of ordinary skill in the art that heating element 20 could operate equally well having fewer or a greater number of components than are illustrated in FIGS. 2A to 4B. Thus, the depiction of heating element 20 in FIGS. 2A to 4B should be taken as being illustrative in nature, and not limiting to the scope of the disclosure.

Figure 5A:
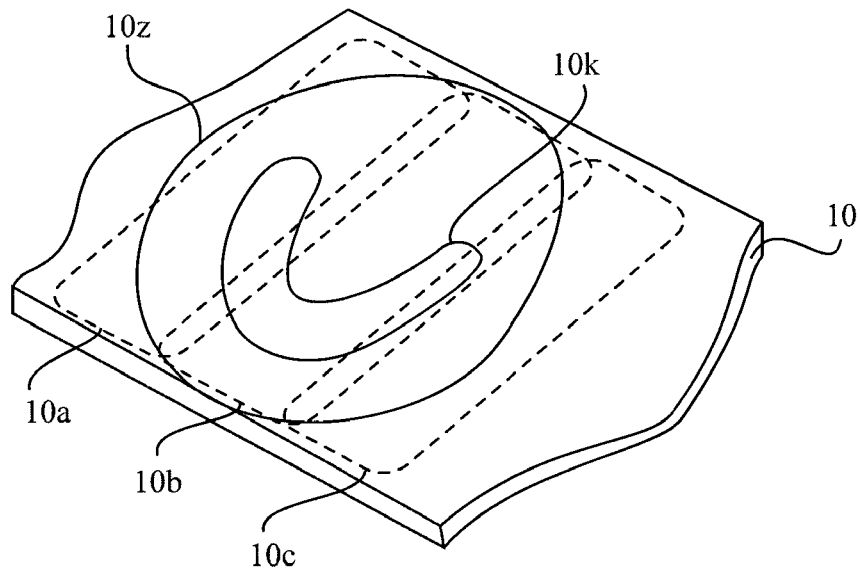
FIG. 5A shows heated portions of a material according to a first embodiment.
Figure 5B:
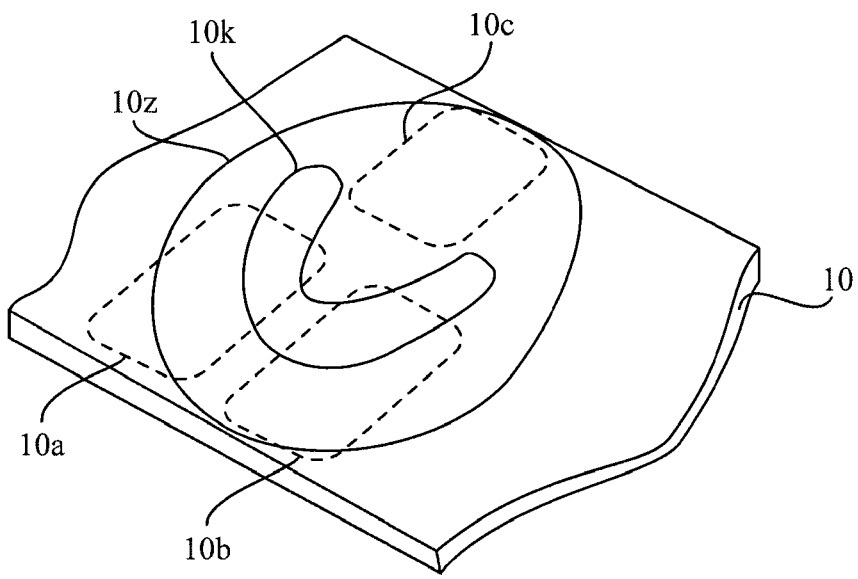
FIG. 5B shows heated portions of a material according to a second embodiment.
Figure 5C:
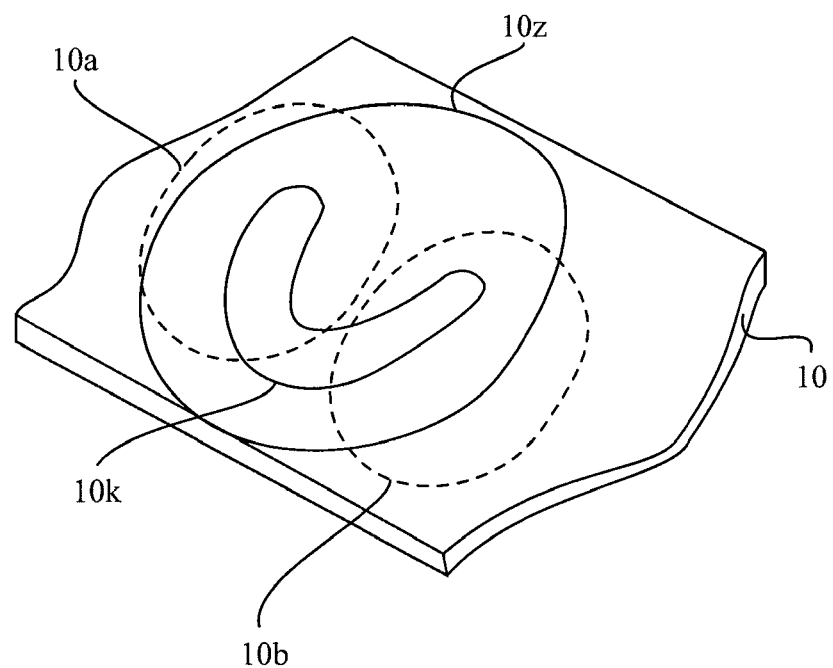
FIG. 5C shows heated portions of a material according to a third embodiment.

FIGS. 5A-5C show heated portions of material 10 according to various embodiments. FIG. 5A shows heated portions 10a, 10b, 10c of material 10 according to a first embodiment. In this embodiment, heated portions 10a, 10b, 10c may correspond to those generated by heat sources 22a, 22b, 22c discussed with reference to FIGS. 2A and 2B. Material 10 includes object portion 10z, where object portion 10z is to be used for subsequently forming object 42 (FIG. 1). Further, object portion 10z includes a deforming portion 10k, where deforming portion 10k will be formed in or around mold 32 by object forming element 30 (FIG. 1).

In this embodiment, deforming portion 10k is in the shape of patient-removable orthodontic appliance to be disposed over a patient's teeth. However, deforming portion 10k may be any suitable shape for forming a desired object, where the object may be any suitable object as previously discussed.

Heated portions 10a, 10b, 10c in this embodiment collectively encompass the entire object portion 10z, as well as the entire deforming portion 10k. Each heated portion 10a, 10b, 10c also includes a unique portion of deforming portion 10k. Accordingly, a heat of different portions of deforming portion 10k may be selectively controlled. In this fashion, some portions of material 10 which require greater malleability for molding can be selectively heated, whereas other portions that do not require such level of malleability can also be selectively heated. For example, the portions of deforming portion 10k that require greater malleability can be selectively heated to a greater degree, while other portions of deforming portion 10k that do not require a great degree of malleability can be selectively heated to a degree lower than that of the aforementioned portions. Similarly, portions of object portion 10z that require greater malleability for molding can be selectively heated to a greater degree, while other portions of object portion 10z that do not require a great degree of malleability can be selectively heated to a degree lower than that of the aforementioned portions.

In some embodiments, different portions of material 10 may be selectively heated to ensure a consistent heating across some or all of material 10. For example, by feedback from temperature sensor 24, heating element 20 may be controlled so that deforming portion 10k and/or object portion 10z have the same temperature (FIG. 1). Further, the different portions of material 10 may be heated at different rates or at the same rate, so as to achieve the same or different temperatures. In some cases, a desired temperature of one or more portions of material 10 may be achieved without overshooting. That is, by use of temperature sensor 24, heating element 20 may be controlled so that a desired temperature of one or more portions of material 10 is reached without a temperature of one of more portions of material 10 exceeding the desired temperature (FIG. 1).

FIG. 5B shows heated portions 10a, 10b, 10c of material 10 according to a second embodiment. In this embodiment, heated portions 10a, 10b, 10c may correspond to those generated by heat sources 22a, 22b, 22c discussed with reference to FIGS. 3A and 3B. The features discussed with reference to FIG. 5A are equally applicable in this embodiment, with the following exceptions.

In this embodiment, heated portions 10a, 10b, 10c do not encompass the entire object portion 10z, nor do they encompass the entire deforming portion 10k. Rather, heated portions 10a, 10b encompass a portion of deforming portion 10k, and heated portion 10b does not encompass any portion of deforming portion 10k, but does encompass a portion of object portion 10z. Further, heated portions 10a, 10b, 10c do not overlap with one another. In this fashion, some portions of object portion 10z may be heated independently of heating deforming portion 10k.

FIG. 5C shows heated portions 10a, 10b of material 10 according to a third embodiment. In this embodiment, heated portions 10a, 10b may correspond to those generated by heat communicated via heat directing chambers 26a, 26b discussed with reference to FIGS. 4A and 4B. The features discussed with reference to FIGS. 5A and 5B are equally applicable in this embodiment, with the following exceptions.

In this embodiment, heated portions 10a, 10b do not encompass the entire deforming portion 10k, nor do they encompass the entire object portion 10z. Rather, heated portions 10a, 10b encompass only a portion of each of deforming portion 10k and object portion 10z. In this fashion, portions of deforming portion 10k and object portion 10z may be directly heated whereas other portions may not be directly heated.

FIGS. 5A to 5C show various embodiments for heating portions of material 10. However, it will be appreciated by those of ordinary skill in the art that more or fewer portions of material 10 may be heated than are illustrated in FIGS. 5A to 5C. Thus, the depiction of heated portions of material 10 in FIGS. 5A to 5C should be taken as being illustrative in nature, and not limiting to the scope of the disclosure.

Figure 6:
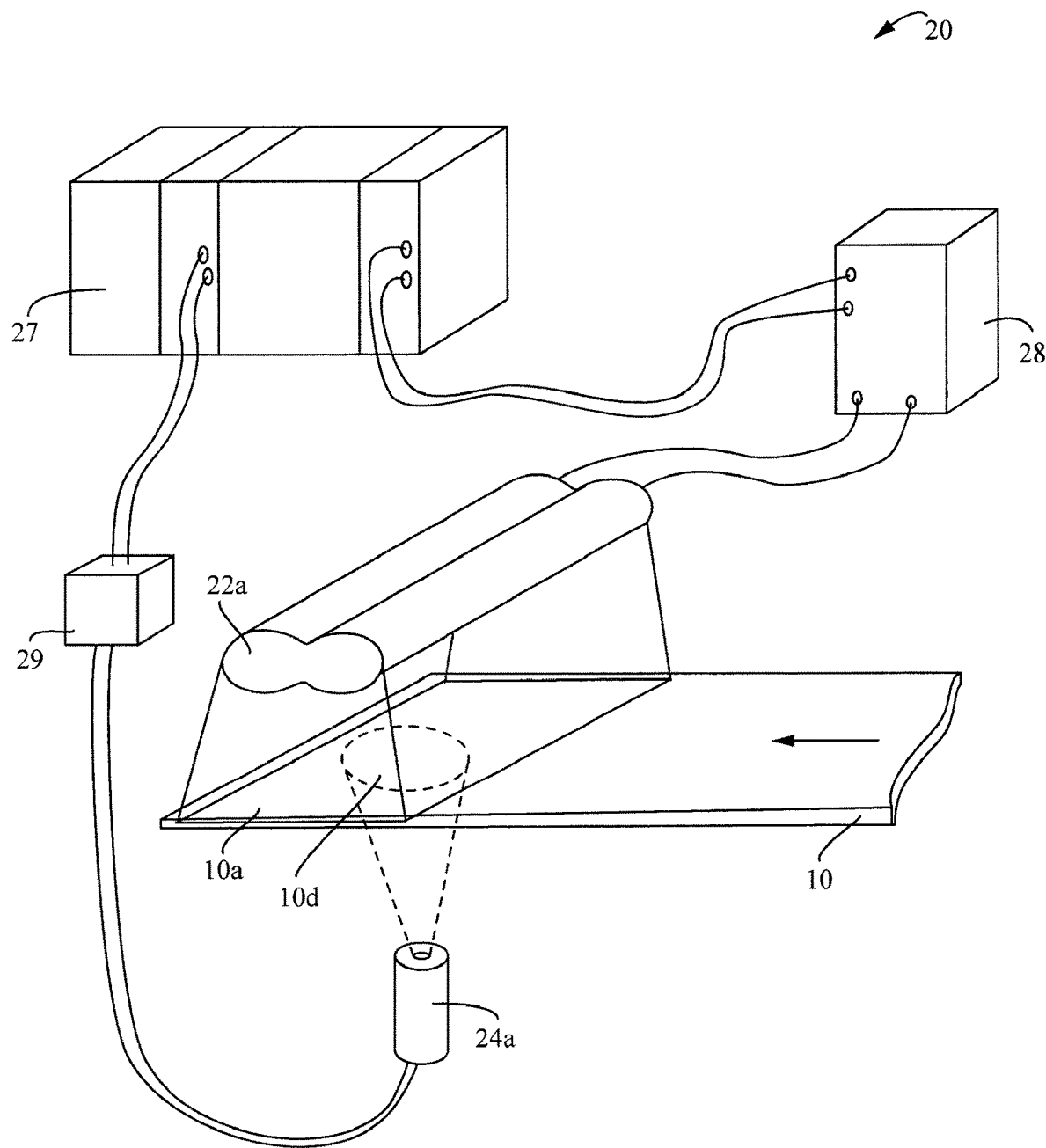
FIG. 6 shows a heating element according to an embodiment.

FIG. 6 shows a heating element 20 according to an embodiment. In this embodiment, heating element 20 includes a heat source 22a, a temperature sensing element 24a, a machine controller 27, a heat source controller 28, and a signal conditioner 29. For each of the elements identified with the same number as previously used herein, the same discussion as that previously articulated is applicable. The newly illustrated elements and their relationship to those already presented will now be discussed.

Machine controller 27 is any suitable electronic computing device operable to receive temperature signals from temperature sensing element 24a and communicate thermal control signals to heat source controller 28. Machine controller 27 is electrically connected to temperature sensing element 24a via signal conditioner 29, where cables may be provided to electrically couple machine controller 27 to signal conditioner 29 and signal conditioner 29 to temperature sensing element 24a. Machine controller 27 is electrically connected to heat source 22a via heat source controller 28, where cables may be provided to electrically couple machine controller 27 to heat source controller 28 and heat source controller 28 to heat source 22a.

Signal conditioner 29 is any suitable electronic computing device operable to perform signal conditioning on a received signal. For example, signal conditioner 29 may filter noise from a received signal, amplify certain bandwidths of a received signal, etc. Signal conditioner 29 receives temperature signals from sensing element 24*a*, where the temperature signals indicate a temperature of material within temperature sensed portion 10*d*. After receiving the temperature signals, signal conditioner 29 performs signal processing on the received signals, and then communicates the processed temperature signals to machine controller 27.

In some embodiments, there is no signal conditioner 29. Rather, machine controller 27 directly receives temperature signals from temperature sensing element 24*a*. In other embodiments, the functionality of signal conditioner 29 is performed by machine controller 27.

After receiving the temperature signals, machine controller 27 may control an output of heat source 22*a* based on the received temperature signals and a desired temperature. Heat source 22*a* may be controlled to heat portions of material 10 in any of the fashions previously discussed. The desired temperature may be received or determined in a variety of ways, as further discussed with reference to FIGS. 7 and 8. In controlling the output of heat source 22*a*, machine controller 27 may communicate a thermal control signal to heat source controller 28, where the thermal control signal instructs heat source controller 28 to increase or decrease an output of heat source 22*a*. In some embodiments, the thermal control signal may also or alternatively instruct heat source controller 28 to change a direction of the output of heat source 22*a*.

Heat source controller 28 is any suitable electronic computing device operable to control an output of heat source 22*a* based on a received thermal control signal. In one embodiment, heat source controller 28 controls an output of heat source 22*a* by communicating a power signal to heat source 22*a*. The characteristics of the power signal vary depending on the type of technology comprising heat source 22*a*. In some embodiments, the power signal may be a low voltage digital signal. In other embodiments, the power signal may be a high voltage analog signal. In this embodiment, heat source 22*a* is a carbon emitter, and the power signal ranges from 0 to 70 VAC. Further, in this embodiment, heat source controller 28 increases a voltage of the power signal in response to thermal control signal indicating an increase in output from heat source 22*a*, and heat source controller 28 decreases a voltage of the power signal in response to thermal control signal indicating a decrease in output from heat source 22*a*.

In another embodiment, heat source controller 28 controls a direction of heat source 22*a* by communicating an adjustment signal to heat source 22*a*. The characteristics of the adjustment signal vary depending on the structure of heat source 22*a*. In some embodiments, the adjustment signal may be an analog or digital signal instructing heat source 22*a* to change its orientation. In other embodiments, the adjustment signal may be an analog or digital signal instructing a heat directing chamber 26*a*, 26*b* to change its orientation.

In some embodiments, there is no heat source controller 28. Rather, machine controller 27 directly communicates thermal control signals to heat source 22*a*. In other embodiments, the functionality of heat source controller 28 is performed by machine controller 27. Further, although FIG. 6 shows only a single heat source 22*a* and temperature sensing element 24*a*, numerous other possibilities and variations as previously discussed are also within the scope of this application.

In one embodiment, machine controller 27 is electronically coupled to other elements of system 100 discussed with reference to FIG. 1. For example, machine controller 27 may be electronically coupled to moveable element 12, object forming element 30, and/or extracting element 40. Machine controller 27 may then be operable to receive information from each of these elements, and communicate control signals to each of these elements for controlling an operation thereof. Further processing by machine controller 27 is discussed with reference to FIGS. 7 and 8.

Heating element 20 in one embodiment includes machine controller 27, heat source controller 28, and signal conditioner 29. However, it will be appreciated by those of ordinary skill in the art that heating element 20 could operate equally well in a heating element 20 having fewer or a greater number of components than are illustrated in FIG. 6. Thus, the depiction of heating element 20 in FIG. 6 should be taken as being illustrative in nature, and not limiting to the scope of the disclosure.

Figure 7:
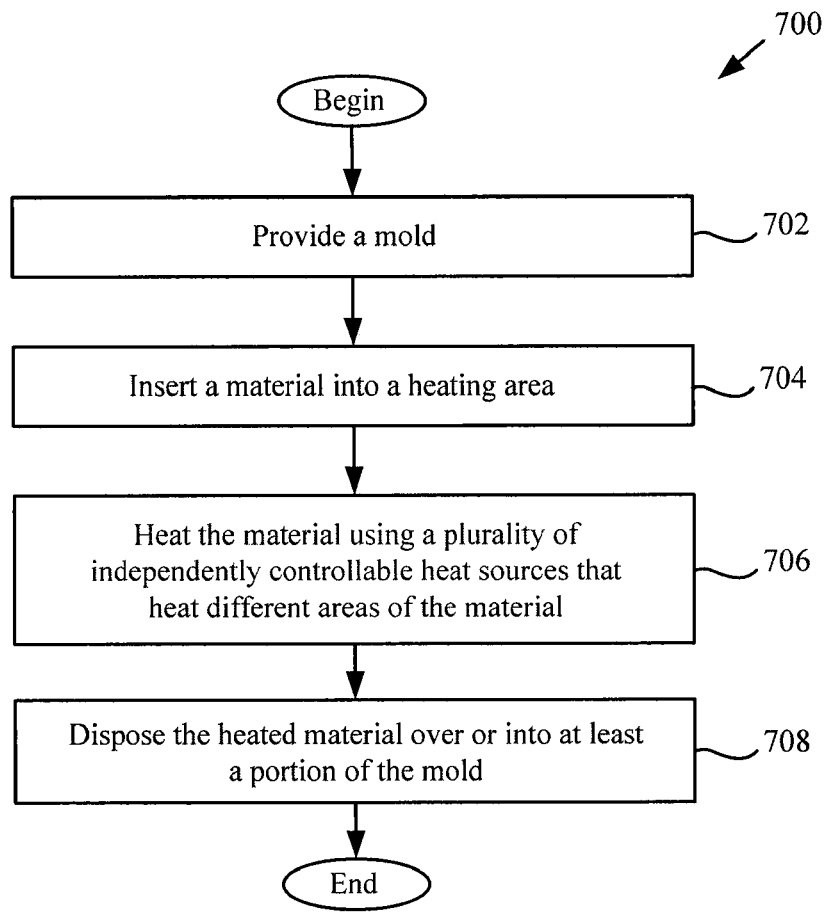
FIG. 7 is a flowchart depicting example operations for thermal forming an object in accordance with a first embodiment.

FIG. 7 is a flowchart 700 depicting example operations for thermal forming an object in accordance with a first embodiment. In operation 702, a mold is provided. For example, mold 32 may be disposed in mold carrier 38 of object forming element 30 (FIG. 1). Mold 32 may thus be operatively coupled to object forming element 30. In some embodiments mold 32 may be positioned into mold carrier 38 by a mold positioning device (not shown). For example, the mold positioning device may be a robotic arm for moving objects between locations. Accordingly, the mold positioning device may operate to provide and remove mold 32 to and from mold carrier 38.

In operation 704, a material 10 is inserted into a heating area 18 (FIG. 1). Material 10 may be inserted into heating area 18 using any suitable means. For example, material 10 may be inserted into heating area 18 via movable element 12 (FIG. 1). In some embodiments, a portion of material 10 is inserted into heating area 18 and subsequently held stationary in heating area 18 during a subsequent heat treatment. In other embodiments, material 10 may be continuously transported through heating area 18 without stoppage. In one embodiment, machine controller 27 (FIG. 6) operates to control movable element 12.

In operation 706, material 10 is heated using a plurality of independently controllable heat sources 22*i* (FIG. 1) that heat different areas of the material. Various portions of material 10 may be heated using any of the independently controllable heat sources 22*i* and/or heat directing chambers 26*a*, 26*b* as previously discussed. In one embodiment, machine controller 27 operates to control independently controllable heat sources 22*i* and/or heat directing chambers 26*a*, 26*b* so as to heat a portion of material 10 located in heating area 18.

In operation 708, the heated material 10 is disposed over or into at least a portion of the mold 32. The heated material 10 may be disposed over or into mold 32 using any suitable process as previously discussed. In one embodiment, machine controller 27 operates movable element 12 to move the heated material 10 from heating area 18 to a location between top chamber 34 and bottom chamber 36 (FIG. 1). Machine controller 27 may then control object forming element 30 to cause top chamber 34 and bottom chamber 36 to form a sealed chamber with the heated material 10 located therein. Machine controller 27 may then control object forming element 30 to create a vacuum within the sealed chamber, thereby causing portions of the heated material 10 to be formed over contours and/or inside cavities of mold 32.

It should be appreciated that the specific operations illustrated in FIG. 7 provide a particular method of thermal forming an object, according to an embodiment of the present invention. Other sequences of operations may also be performed according to alternative embodiments. For example, alternative embodiments of the present invention may perform the operations outlined above in a different order. Moreover, the individual operations illustrated in FIG. 7 may include multiple sub-operations that may be performed in various sequences as appropriate to the individual operation. Furthermore, additional operations may be added or removed depending on the particular applications. One of ordinary skill in the art would recognize and appreciate many variations, modifications, and alternatives. For example, one or more movable element 12 and object forming element 30 may include their own electronic computing device for controlling that element. Accordingly, machine controller 27 need not control the operation of each of these elements.

Figure 8:
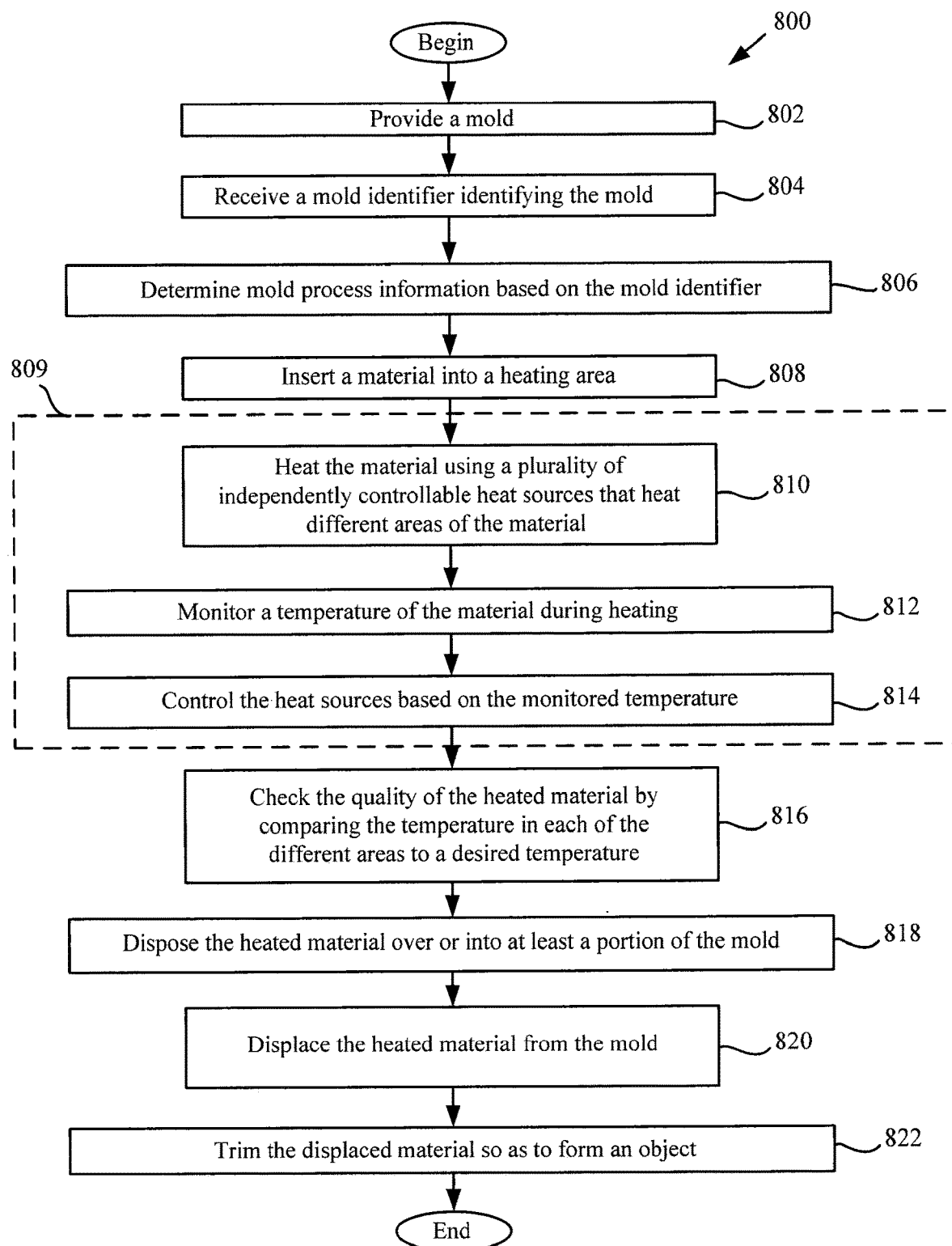
FIG. 8 is a flowchart depicting example operations for thermal forming an object in accordance in accordance with a second embodiment.

FIG. 8 is a flowchart 800 depicting example operations for thermal forming an object in accordance in accordance with a second embodiment. In operation 802, a mold 32 (FIG. 1) is provided, similar to operation 702. In operation 804, a mold identifier for identifying the mold 32 is received. In one embodiment, machine controller 27 (FIG. 6) receives the mold identifier. The mold identifier may be received from any suitable source. For example, it may be input by a user. For another example, the mold identifier may be located on or in mold 32, and the mold identifier may be read from mold 32 using any suitable technology. For example, the mold identifier may be provided in an RFID chip which may be read by machine controller 27. For another example, the mold identifier may be read using a bar code scanner electronically coupled to or included in machine controller 27.

In one embodiment, machine controller 27 also or alternatively receives a material identifier for identifying material 10. The material identifier may be received from any suitable source. For example, it may be input by a user. For another example, the material identifier may be located on or in material 10, and the material identifier may be read from material 10 using any suitable technology. For example, the material identifier may be provided in an RFID chip which may be read by machine controller 27. For another example, the material identifier may be read using a bar code scanner electronically coupled to machine controller 27.

In operation 806, mold process information is determined based on the mold identifier. In some embodiments, the mold process information may also or alternatively be determined based on the material identifier. Mold process information may include any suitable information for forming object 42 (FIG. 1). For example, mold process information may include control information for controlling one or more of the elements of system 100. In one embodiment, mold process information includes heating information, such as a desired heating temperature at various locations of material 10, a desired heating time at various locations of material 10, a maximum cooling period between heating material 10 and disposing the heated material over or into mold 32, a maximum heating temperature for any portion of material 10, etc. Machine controller 27 may use this information to subsequently control the various elements, such as movable element 12, heating element 20, etc. of system 100 (FIG. 1). In one embodiment, mold process information for various different molds 32 is pre-stored in machine controller 27 and associated with mold identifiers and/or material identifiers, so that machine controller 27 may subsequently determine or read such information in response to receiving the mold identifier and/or material identifier.

In operation 808, a material 10 is inserted into a heating area 18 (FIG. 1), similar to operation 704. In operation 809, a portion of material 10 is heat treated by heating element 30 (FIG. 1). The heat treatment of operation 809 includes one or more operations. In one embodiment, operation 809 includes operations 810, 812, and 814.

In operation 810, the material 10 is heated using a plurality of independently controllable heat sources 22i (FIG. 1) that heat different areas of the material 10, similar to operation 706. In operation 812, a temperature of the material 10 is monitored during heating. Machine controller 27 may monitor the temperature of the material 10 using temperature sensor 24 (FIG. 1). Temperatures of portions of the material 10 may be monitored in accordance with any of the previously discussed embodiments.

In operation 814, the heat sources 22i are controlled based on the monitored temperature. Machine controller 27 may control an output or operation of heat sources 22i and/or heat directing chambers 26a, 26b based on the temperature monitored using temperature sensor 24. In one embodiment, the heat sources 22i and/or heat directing chambers 26a, 26b may be controlled so that the temperatures at different areas of the material 10 selectively reach the desired temperature. A temperature at different areas of material 10 may be selectively controlled in response to independently monitoring a temperature at different areas of material 10.

The desired temperature may be determined in any suitable fashion. For example, a user may input the desired temperature into machine controller 27. For another example, the desired temperature may be included in the mold process information and thus obtained using a mold identifier associated with mold 32 and/or a material identifier associated with material 10. In one embodiment, the desired temperature is reached without overshooting. That is, by use of temperature sensor 24, heating sources 22i and/or directing chambers 26a, 26b may be controlled so that the desired temperature of one or more portions of material 10 is reached without a temperature of one of more portions of material 10 exceeding the desired temperature.

In operation 816, a quality of the heated material 10 is checked by comparing the temperature in each of the different areas to a desired temperature. The quality of the heated material 10 may be determined based on differences between a measured and desired temperature. For example, if the measured temperature exceeds the desired and/or maximum temperature, the quality of the material 10 may be determined to be unacceptable. For another example, if the measured temperature significantly exceeds the desired and/or maximum temperature, the quality of the material 10 may be determined to be unacceptable.

In some embodiments, an amount of time at which the temperature difference exists may also be taken into consideration. For example, if the measured temperature exceeds the desired and/or maximum temperature for less than a set time, the quality of the material 10 may be determined to be acceptable. On the other hand, if the measured temperature exceeds the desired and/or maximum temperature for an amount of time equal to or greater than a set time, the quality of the material 10 may be determined to be unacceptable. In one embodiment, machine controller 27 may make such determinations based on temperature signals received from temperature sensor 24 and mold process information. In some embodiments, operation 816 may be performed as part of operation 809.

In operation 818, the heated material 10 is disposed over or into at least a portion of the mold 32, similar to operation 708. In operation 820, the heated material 10 is displaced from the mold 32. Any suitable technique for displacing the heated material 10 from the mold after thermal forming the heated material 10 may be used. For example, the deformed, heated material 10 may be air-ejected from mold 32, stripped off of mold 32 using a stripper plate, etc. As a result of displacing the heated material 10 from the mold 32, deformed portions 39 will be formed in the material 10.

In operation 822, the displaced material 10 is trimmed so as to form an object 42. The displaced material 10 (i.e., deformed portions 39) may be trimmed by trimmer 44 (FIG. 1). Any of the previously discussed techniques for trimming may be used. For example, trimmer 44 may engage material 10 such that cutting edges of trimmer 44 physically separate deformed portion 39 from material 10. As a result of trimming, apertures may be formed in material 10.

It should be appreciated that the specific operations illustrated in FIG. 8 provide a particular method of thermal forming an object, according to an embodiment of the present invention. Other sequences of operations may also be performed according to alternative embodiments. For example, alternative embodiments of the present invention may perform the operations outlined above in a different order. Moreover, the individual operations illustrated in FIG. 8 may include multiple sub-operations that may be performed in various sequences as appropriate to the individual operation. Furthermore, additional operations may be added or removed depending on the particular applications. One of ordinary skill in the art would recognize and appreciate many variations, modifications, and alternatives.

Figure 9:
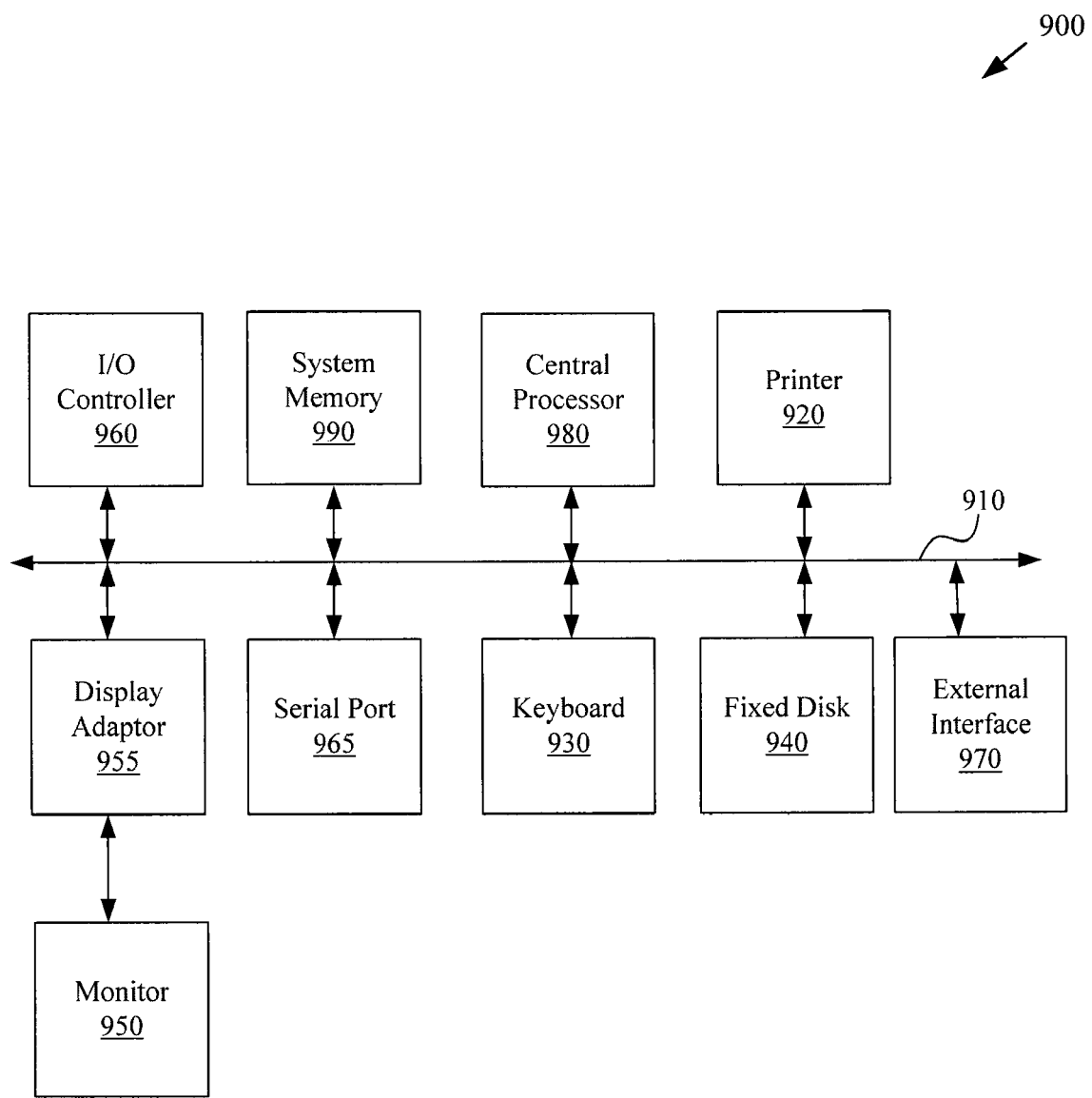
FIG. 9 is a diagram of an electronic computing device according to an example embodiment.

FIG. 9 is a diagram of an electronic computing device 900 according to an example embodiment. The various elements in the previously described system diagrams (e.g., machine controller 27, heat element controller 28, and/or signal conditioner 29) may use any suitable number of subsystems in the computing device to facilitate the functions described herein. Examples of such subsystems or components are shown in FIG. 9. The subsystems shown in FIG. 9 are interconnected via a system bus 910. Additional subsystems such as a printer 920, keyboard 930, fixed disk 940 (or other memory comprising tangible, non-transitory computer-readable media), monitor 950, which is coupled to display adapter 955, and others are shown. Peripherals and input/output (I/O) devices (not shown), which couple to I/O controller 960, can be connected to the computer system by any number of means known in the art, such as serial port 965. For example, serial port 965 or external interface 970 can be used to connect the computing device to a wide area network such as the Internet, a mouse input device, or a scanner. The interconnection via system bus allows the central processor 980 to communicate with each subsystem and to control the execution of instructions from system memory 990 or the fixed disk 940, as well as the exchange of information between subsystems. The system memory 990 and/or the fixed disk 940 may embody a tangible, non-transitory computer-readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a tangible, non-transitory computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

Embodiments of the present invention can be implemented in the form of control logic in software or hardware or a combination of both. The control logic may be stored in an information storage medium as a plurality of instructions adapted to direct an information processing device to perform a set of operations disclosed in embodiments of the present invention. Based on the disclosure and teachings provided herein, a person of ordinary skill in the art will appreciate other ways and/or methods to implement the present invention.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context. The scope of the invention should, therefore, be determined not with reference to the above description, but instead should be determined with reference to the pending claims along with their full scope or equivalents.

What is claimed is:

1. A method for thermal forming an object, the method comprising:
   controlling a mold positioning device to place a mold of a dental arch of a patient into a mold carrier;
   controlling a moveable element to move a thermoformable material into a heating area;
   receiving one or more temperature signals from a plurality of temperature sensing elements in the heating area, each of the plurality of temperature sensing elements being operably coupled to an area of the thermoformable material;
   generating one or more thermal control signals based on the one or more received temperature signals and heating information corresponding to the mold;
   communicating the one or more thermal control signals to control a plurality of heat sources to heat the thermoformable material, wherein the plurality of heat sources produce at least one overlapping heating zone;
   moving the heated thermoformable material and the mold carrier into an object forming element;
   controlling the object forming element to dispose the heated thermoformable material over at least a portion of the mold to generate a deformed portion of the heated thermoformable material; and
   controlling an extracting element to displace the deformed portion of the heated thermoformable material from the mold to form the object.

2. The method of claim 1, wherein the plurality of heat sources are independently controlled to heat the thermoformable material while monitoring the one or more received temperature signals from the plurality of temperature sensing elements to reach one or more desired temperatures.

3. The method of claim 1, wherein the one or more thermal control signals continuously adjust a power of at least one of the plurality of heat sources.

4. The method of claim 1, wherein the heating information comprises a desired heating time.

5. The method of claim 1, wherein the thermoformable material is heated according to the heating information by adjusting a power of at least one of the plurality of heat sources.

6. The method of claim 5, wherein the thermoformable material is heated according to the heating information by adjusting a power of each of the plurality of heat sources.

7. The method of claim 1, wherein the plurality of heat sources each heat a different area of the thermoformable material corresponding to an area of the thermoformable material operably coupled to a corresponding temperature sensing element.

8. The method of claim 7, wherein the different areas of the thermoformable material simultaneously reach a respective desired temperature.

9. The method of claim 7, wherein the different areas of the thermoformable material reach a respective desired temperature at different times.

10. The method of claim 1, wherein the object is an orthodontic appliance.

11. The method of claim 1, wherein the object is an aligner.

12. The method of claim 1, wherein the one or more thermal control signals instruct the plurality of heat sources to perform one or more of activation, deactivation, increase heat, or decrease heat.

13. The method of claim 1, wherein controlling the object forming element comprises pressurizing the object forming element to deform a portion of the heated thermoformable material.

14. A method for thermal forming an object, the method comprising:
    reading a mold identifier located on or in a mold;
    determining mold process information from the mold identifier, the mold process information comprising heating information;
    heating a thermoformable material according to the heating information by adjusting power of one or more of a plurality of independently controllable heat sources, wherein the plurality of independently controllable heat sources produce at least one overlapping heating zone;
    monitoring one or more temperatures from a plurality of temperature sensing elements operably coupled to different areas of the thermoformable material, wherein the thermoformable material is heated according to the heating information and in response to the one or more monitored temperatures such that each of the different areas of the thermoformable material reach a respective desired temperature; and
    disposing the heated thermoformable material over at least a portion of the mold to form the object.

15. The method of claim 14, wherein heating the thermoformable material according to the heating information comprises continuously adjusting a power of the one or more of the plurality of independently controllable heat sources.

16. The method of claim 14, wherein the mold process information further comprises a desired heating time.

17. The method of claim 14, wherein the thermoformable material is heated according to the heating information by adjusting a power of more than one of the plurality of independently controllable heat sources.

18. The method of claim 14, wherein the plurality of independently controllable heat sources heat the different areas of the thermoformable material based on the heating information.

19. The method of claim 14, wherein heating the thermoformable material comprises controlling the plurality of independently controllable heat sources based on the one or more monitored temperatures.

20. The method of claim 14, wherein the different areas of the thermoformable material simultaneously reach the respective desired temperatures.

21. The method of claim 14, wherein the different areas of the thermoformable material the respective desired temperatures at different times.

22. The method of claim 14, wherein the object is an orthodontic appliance.

23. The method of claim 14, wherein the object is an aligner.

24. The method of claim 14, wherein the mold process information further comprises a shape or a thickness of the thermoformable material.

25. The method of claim 14, wherein the plurality of independently controllable heat sources are controlled by a corresponding plurality of heating control signals that instruct the plurality of independently controllable heat sources to perform one or more of activation, deactivation, increase heat, or decrease heat.

26. The method of claim 14, wherein a plurality of heating control signals instruct the plurality of independently controllable heat sources to provide first heat to a first area of the different areas of the thermoformable material and a second heat greater than the first heat to a second area of the different areas of the thermoformable material, thereby producing a second malleability of the second area greater than a first malleability of the first area.

27. The method of claim 14, wherein the mold process information further comprises instructions to pressurize a chamber comprising the mold.

\* \* \* \* \*

UNITED STATES PATENT AND TRADEMARK OFFICE
CERTIFICATE OF CORRECTION

| | | |
|---|---|---|
| PATENT NO. | : 11,623,368 B2 | Page 1 of 1 |
| APPLICATION NO. | : 16/983876 | |
| DATED | : April 11, 2023 | |
| INVENTOR(S) | : Yevgeniy Sirovskiy et al. | |

It is certified that error appears in the above-identified patent and that said Letters Patent is hereby corrected as shown below:

In the Claims

In Column 20, in Claim 21, Line 49, delete "material" and insert -- material reach --, therefor.

Signed and Sealed this
Sixteenth Day of May, 2023

Katherine Kelly Vidal
*Director of the United States Patent and Trademark Office*